US007475357B2

(12) United States Patent
Takeuchi et al.

(10) Patent No.: US 7,475,357 B2
(45) Date of Patent: Jan. 6, 2009

(54) PROGRAM, METHOD AND APPARATUS FOR OPERATING OBJECTS DISPLAYED ON A DISPLAY

(75) Inventors: Masaru Takeuchi, Kodaira (JP); Hiroaki Fujii, Tokorozawa (JP); Atsuko Koizumi, Sagamihara (JP); Kazuya Hisaki, Yokohama (JP); Yasutsugu Morimoto, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 415 days.

(21) Appl. No.: 11/207,839

(22) Filed: Aug. 22, 2005

(65) Prior Publication Data
US 2006/0125845 A1    Jun. 15, 2006

(30) Foreign Application Priority Data
Dec. 9, 2004    (JP)    ............................. 2004-356942

(51) Int. Cl.
G06F 3/048    (2006.01)
G06F 5/00    (2006.01)
G02B 21/00    (2006.01)

(52) U.S. Cl. ................... 715/769; 715/764; 345/619; 359/368

(58) Field of Classification Search ............... 715/757, 715/782, 793, 794, 712, 764, 769; 345/619, 345/621; 359/368
See application file for complete search history.

(56) References Cited

U.S. PATENT DOCUMENTS 6,577,330 B1*   6/2003   Tsuda et al. ................ 715/782
2004/0100479 A1*   5/2004   Nakano et al. ............. 345/700

FOREIGN PATENT DOCUMENTS

| JP | 05-046311 | 8/1991 |
| JP | 06-289996 | 4/1993 |
| JP | 09-330177 | 6/1996 |
| JP | 10-222307 | 2/1997 |
| JP | 2001-307119 | 4/2000 |

* cited by examiner

Primary Examiner—Weilun Lo
Assistant Examiner—Truc T Chuong
(74) Attorney, Agent, or Firm—Reed Smith LLP; Stanley P. Fisher, Esq.; Juan Carlos A. Marquez, Esq.

(57) ABSTRACT

To display many objects within a limited display region so a user can easily select the desired object, the invention includes: processing of arranging the objects in a virtual plane, processing of arranging a projection surface (a virtual projection body) on the virtual plane, processing of computing positions of the objects on the projection surface corresponding to the positions of the objects on the virtual plane, processing of converting the positions on the projection surface into positions on display regions of a display device, processing of displaying the objects on the display regions, and processing of operating the objects on the display regions based on instructions from a pointing device.

15 Claims, 36 Drawing Sheets

PROGRAM, METHOD AND APPARATUS FOR OPERATING OBJECTS DISPLAYED ON A DISPLAY

CLAIM OF PRIORITY

The present application claims priority from Japanese application P2004-356942 filed on Dec. 9, 2004, the content of which is hereby incorporated by reference into this application.

BACKGROUND OF THE INVENTION

This invention relates to an improvement on a graphical user interface, for using a keyboard, a pointing device, or other such input device to operate a computer object on a display.

Conventionally, in order to operate software resources and hardware resources of a computer, a graphical user interface (referred to hereinafter as GUI) has been used. As a GUI for operating an object that can be accessed from a computer, for example, a GUI in which a mouse cursor or other such pointing device is used to perform a selection operation in a directory or folder containing objects, to select a desired object, is widely known.

Due to increase in computer processing power and storage capacity, there is also an increase in the number of objects that are stored in a computer, and the number of objects that can be accessed via a network. With the above-mentioned GUI, there are cases where it is difficult to quickly select the desired object from among a large number of objects. As techniques for improving the operation of objects by using the GUI, the following proposals have been made.

A device is known, which extracts an adjacent object in the direction being traveled by a pointing device being operated by a user, and immediately moves a pointing cursor toward the coordinate position of that adjacent object (see JP 6-289996 A). Furthermore, a control system is known, which, from the migration speed of a mouse cursor on a display, predicts an object located at the migration destination point, and moves the mouse cursor to the predicted object (see JP 10-222307 A). Besides these, other techniques are known, such as a control system which uses the migration direction of a mouse cursor on a display, to judge a rectangular region which the user intends as the migration destination, and moves the cursor there (see JP 5-46311 A), and a device which detects an object located on a line extending along the direction in which a mouse cursor is migrating, and selects a candidate destination object (see JP 9-330177 A), etc.

Furthermore, as a technique for extracting information that is currently necessary from among a large amount of information to perform an easy-to-view display on a display, there is known a bird's-eye view display device, which is used in car navigation systems and the like (see JP 2000-307119 A). This technique utilizes a portion of a curved surface having a changeable rate of curvature, and simultaneously displays map information of places located distantly in the direction in which the car is advancing, and map information of places located near the car's position.

SUMMARY OF THE INVENTION

However, the conventional examples in Patent Documents (JP 6-289996 A, JP 10-222307 A, JP 5-46311 A, JP 9-330177 A) mentioned above are constructed such that the object is displayed on the display and the displayed object is operated with the mouse cursor. Due to this, there is a problem that the number of objects that can be selected is limited by the area of the display region of the display. In other words, in these conventional examples, operation can only be performed on the objects displayed on the display. However, there are many cases where the number of objects stored in the computer, or the number of objects that can be accessed from the computer, is greater than the number of objects that can be displayed in the limited display region of the display. Therefore, in a case where an object that is needed by the user of the computer is not being displayed in the limited display region, there is a problem that this object cannot be easily retrieved.

Furthermore, as in KJ method for organizing proposals, when the procedure of categorizing and discarding/selecting many objects is performed on the above-mentioned conventional GUI, needed objects and unneeded objects equally occupy the display region of the display. Therefore, there was a problem that the selection of the object could not be performed efficiently.

Furthermore, the conventional example in Patent Document (JP 2000-307119 A) mentioned above is appropriate for displaying map information which has information of coordinates (latitude, longitude, height) and distance, but there is a problem in that the technique cannot be applied to objects on a computer which do not have position information such as distance and coordinates.

Thus, this invention has been made in light of the above-mentioned problems, and it is an object of this invention to provide a GUI in which many objects can be displayed within a limited display region, and a user can select a desired object easily.

This invention includes: processing of arranging an object in a pre-set virtual space; processing of arranging a projection surface that is pre-set in the virtual space; processing of computing the position of the object on the projection surface, corresponding to the position of the object in the virtual space; processing of converting the position on the projection surface, into a position in a display region of a display device; processing of displaying the object in the display region; and processing of operating the object in the display region, based on an instruction from a pointing device.

Furthermore, processing of converting to the position in the display region of the display device includes: processing of converting the position of the object projected on a first projection surface, which is a plane facing the virtual space, into a position in a first display region set in the display region of the display device, and processing of converting the position of the object projected on a second projection surface into a position in a second display region that is set in the display region of the display device.

Therefore, this invention arranges the object in the virtual space and the object is displayed via the projection surface, whereby many objects can be displayed in a limited display region and an overview of the entirety can be performed.

Furthermore, by providing the projection surface with a plane for performing projection which corresponds to the first display region, detailed operations of the object, such as display, input/output, migration, iconization, and the like of the object become possible. In the second display region corresponding to the second projection surface only the presence of the object is displayed, whereby many objects can be displayed to enable the overview of the entirety and also apprehension of object details so that the user can select the desired object easily.

DETAILED DESCRIPTION OF THE PREFERRED EMBODIMENTS

Hereinafter, embodiments of this invention will be explained based on the attached drawings.

Figure 1:
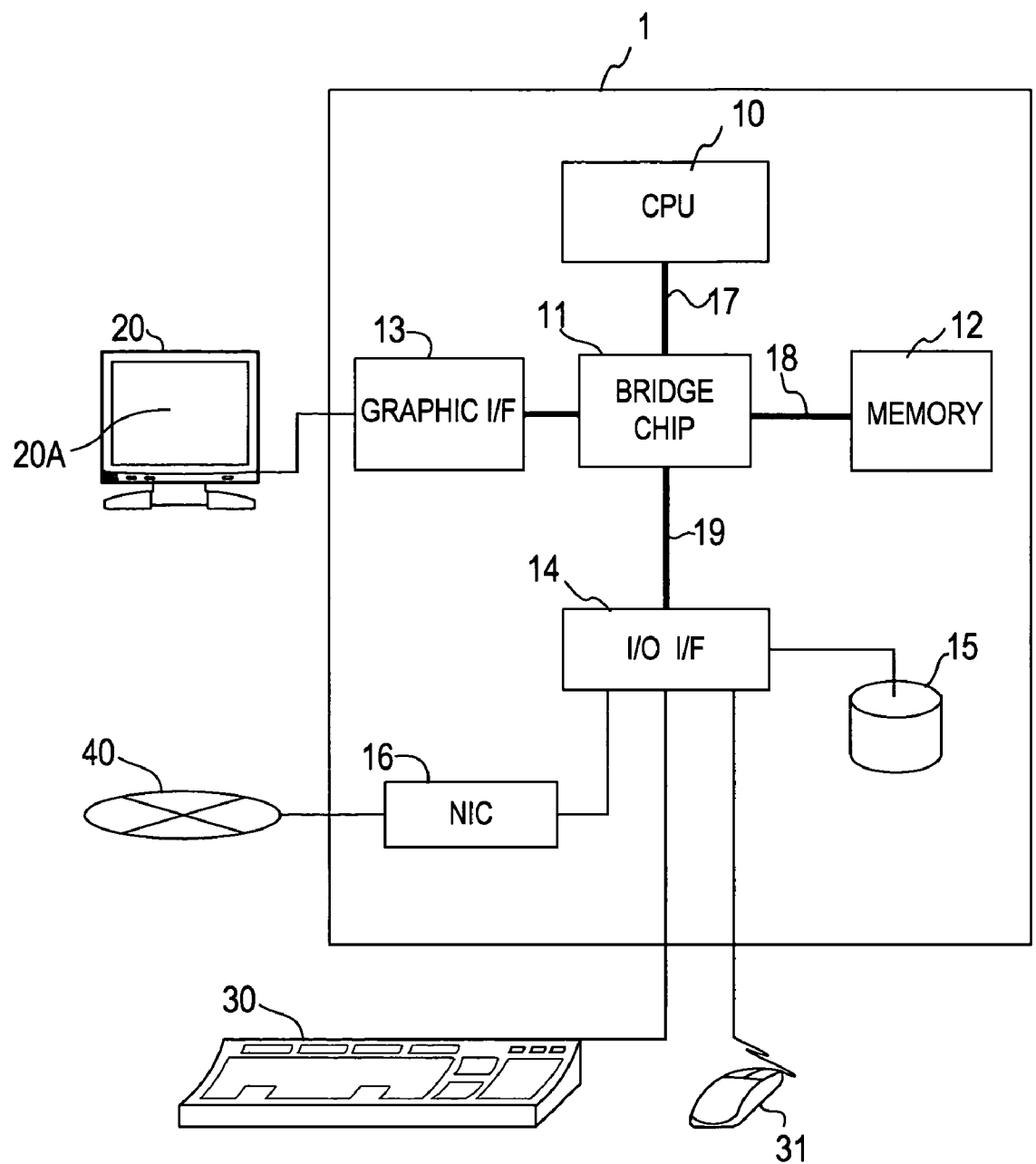
FIG. 1 is a block diagram of a computer, showing an embodiment of this invention.

FIG. 1 shows a first embodiment of this invention, showing a construction of a computer 1 in which this invention is applied.

The computer 1 has a CPU 10 for performing computation processing, and this CPU 10 is connected to a bridge chip (or memory controller or chip set) 11 via a front side bus 17.

To the bridge chip 11 is connected a memory (main memory) 12 via a memory bus 18, and an I/O interface 14 is connected to the bridge chip 11 via a bus 19. To the I/O interface 14 is connected an I/O device. This I/O device, for example, is constructed as a disk device 15 stored in the computer 1, a network interface 16 for connecting to a network 40, a keyboard 30 for inputting an instruction or data from a user into the computer 1, or a mouse 31 or the like serving as a pointing device. It should be noted that, as the pointing device, a touchpad, tablet or the like may be used in addition to the above-mentioned mouse 31.

Furthermore, to the bridge chip 11 is connected a graphic interface 13 for outputting image information, and to this graphic interface 13 is connected a display device 20.

The CPU 10 executes an object categorization GUI (Graphical User Interface) according to this invention on an OS that is loaded into the memory 12. The object categorization GUI (or object categorization interface) executes migration of a pointer (mouse cursor) or display region or display position on the display device 20, according to migration amount, migration speed and direction of the mouse 31.

Figure 2:
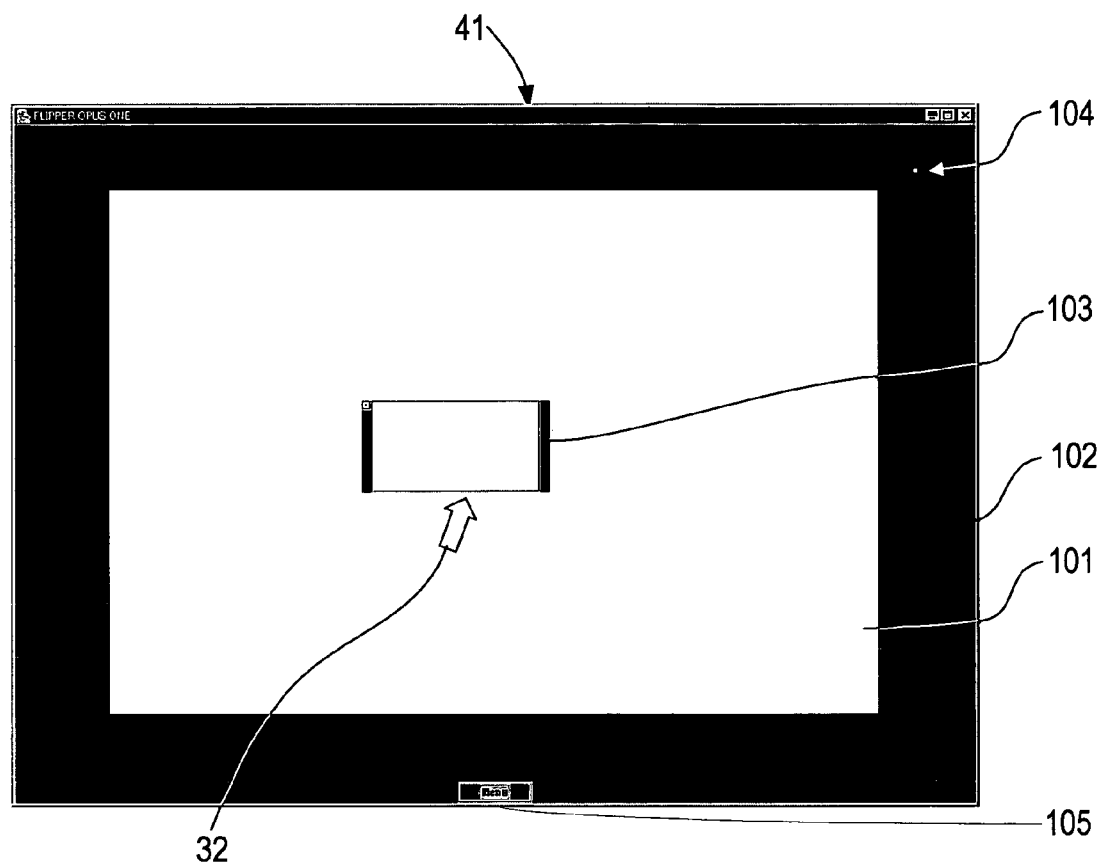
FIG. 2 is an explanatory diagram showing a state of displaying an object categorization GUI of this invention.

FIG. 2 shows an overview of the object categorization GUI displayed in the display region 20A of the display device 20. The object categorization GUI is constructed from two types of regions: an operation region 101 shown as a rectangular region that is white within the figure, and an overview region 102 shown as a black border region. The object categorization GUI arranges the operation region 101 inside the overview region 102, and displays the details of the object (or the actual thing) in the operation region 101, and displays the presence of the object in the overview region 102. It should be noted that, FIG. 2 shows an application window 41 of the object categorization GUI, and this application window 41 is displayed at an arbitrarily determined location on the display region 20A of the display device 20, and at an arbitrarily determined size as shown in FIG. 1.

Here, the object shows an icon, text data, image data, HTML data, folder content, application-specific input/output form and the like, which are accessible from the computer 1. The object may be stored in the disk device 15 of the computer 1, or may be stored in a computer resource on the network 40.

Within the object categorization GUI, as described below, as a space for arranging the object there is provided a virtual plane constructed as plane, and the object categorization GUI arranges the object on this virtual plane and manages it.

On the other hand, the display region (20A in FIG. 1) refers to the entire screen of the display device 20 (the entire display region), and the plane where the object is displayed such as the application window's display portion and the like. It should be noted that, in the present embodiment, the virtual plane has unlimited breadth in that it refers to a sufficiently large value that can be held within the computer 1. In other words, the size of the virtual plane is a region that can be set in the computer 1. For example, it can be set as a region (which is a 2-dimensional plane here) with the maximum value that the hardware resources and OS of the computer 1 can handle.

The operation region 101 performs detailed display of the object, it is a region where input/output of the object, object migration, object iconization, and other operations of the object are performed, and it is provided with functions that are equivalent to the computer interface, which is made of the keyboard 30 or the mouse 31 (pointing device). The operation region 101 displays the specific content of the object on the virtual plane in a visible fashion, and enables operations such as input/output and the like.

In this invention, operation is performed in the operation region 101 and in the overview region 102, by using a mouse cursor 32 which migrates on the display region 20A of the display device 20, in response to migration of the mouse 31. Furthermore, the object categorization GUI receives the mouse 31 button operation, to perform various processing as described below.

It should be noted that, as the pointing device, in addition to the mouse 31, a tablet pen or stylus pen or touchpad or the like may be used. The object categorization GUI receives input of position information and information relating to button operations from the pointing device.

The overview region 102 is a region for providing an overview of the portion other than the operation region from the virtual plane, on which the objects are arranged. In the overview region 102, in the positions where the objects are arranged, there are shown only figures (for example, only specks) to indicate their presence. Namely, the user of the computer 1 can understand the presence of an object from a speck in the overview region 102, but the cannot see the content of this object in the overview region 102.

In FIG. 2, reference numeral 103 refers to a card object, which is used in the present embodiment as one example of the object. In the operation region 101, the object itself is displayed. On the other hand, in the overview region 102, the object is displayed with a small, white speck, which is a point 104. Furthermore, in the center at the bottom of the figure is arranged a menu button 105 for opening menu items, to perform such operations as adjusting parameters of the object categorization GUI, inputting/editing labels, exiting, and the like.

<Summary of Object Categorization GUI>

Figure 3:
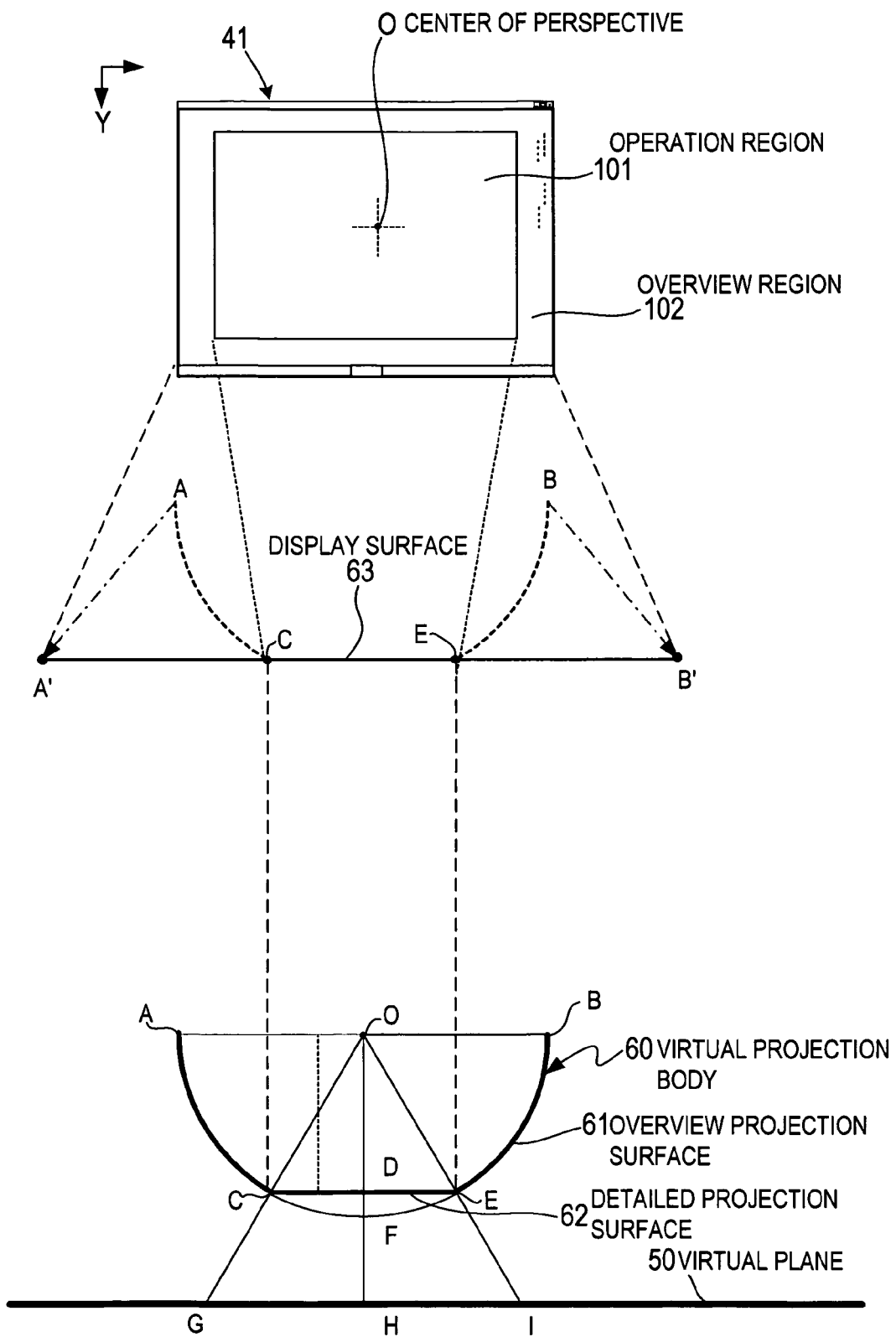
FIG. 3 is an explanatory diagram explaining a relationship between display regions of a display device, and a virtual plane where objects are arranged.

A summary of the object categorization GUI is explained with reference to FIG. 3. FIG. 3 is an explanatory diagram showing a relationship between the object categorization GUI window, and the space.

The object categorization GUI is provided with the virtual plane (virtual space) 50 serving as the space where the object is arranged, and a virtual projection body 60 formed as a cuboid with sides as curved surfaces for projecting the object on the virtual plane 50.

The virtual plane 50 is a space (which is a 2-dimensional space here) which the computer 1 and the OS can handle, as described above.

The virtual projection body 60 arranges the rectangular plane so that it is parallel with the virtual plane 50, at a position facing the virtual plane 50. Its four sides are constructed as curved surfaces with predetermined rates of curvature r. The planes in these directions and outer periphery of the four sides serve as the projection surface on which the object on the virtual surface 50 is projected.

Figure 4:
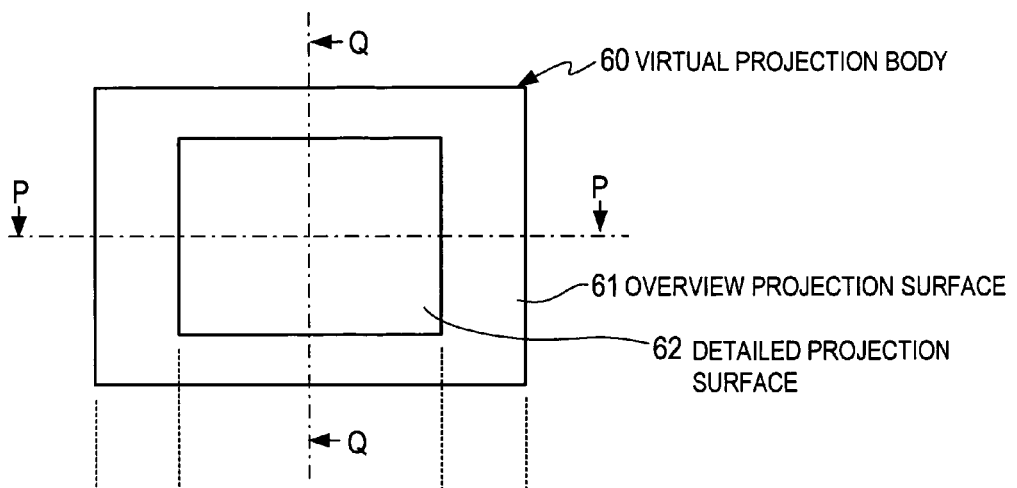
FIG. 4A shows a virtual projection body which makes up a projection surface, with (A) a planar diagram.
FIG. 4B shows a virtual projection body which makes up a projection surface, with a cross-sectional diagram along P-P.
FIG. 4C shows a virtual projection body which makes up a projection surface, with a cross-sectional diagram along Q-Q.

The projection surface is divided into two regions. The bottom surface of the virtual projection body 60, formed as the rectangular plane parallel to the virtual plane 50, serves as a detailed projection surface 62. The side of the virtual projection body 60, formed as the curved surface, serves as an overview projection surface 61. In other words, in the virtual projection body 60, as shown in FIG. 4A to FIG. 4C, each of the sides of the cuboid is formed as the curved surface, the plane that is the bottom surface serves as the detailed projection surface 62, and the four sides serve as the overview projection surface 61.

Then, as shown in FIG. 3, the overview projection surface 61 formed as the curved surface opens in a plane, and joins with the detailed projection surface 62, thus forming a display surface 63. In other words, for the object on the virtual plane 50 being projected onto the side of the virtual projection body 60, the overview projection surface 61 represented by the curve AC in the figure is opened to a straight line A'C., whereby the overview projection surface 61 is displayed on a plane (display surface 63) that is identical to the detailed projection surface 62. The object projected on the display surface 63 is displayed on the operation region 101 and the overview region 102 inside the application window 41. For example, as shown in the figure, the object projected on the overview projection surface 61 (straight line A'C. or B'E in the figure) is displayed on the overview region 102, and the object projected on the detailed projection surface 62 is displayed. in the operation region 101.

It should be noted that, as described below, the display surface 63 is set to an arbitrarily determined height from the virtual plane 50, and furthermore, the virtual projection body 60 can migrate over the virtual plane 50.

The display surface 63 corresponds to coordinates displayed in the application window 41. The center O of the operation region 101 corresponds to the center of the display surface 63, and these centers O are referred to as the center of perspective. It should be noted that the center of perspective O and the projection surface (the overview projection surface 61 and the detailed projection surface 62) are collectively referred to as the projection system.

The detailed projection surface 62 is set on an angle C-O-E which is determined based on the center of perspective O, and is a plane passing through a line segment C-E in the figure. It should be noted that, C and E in the figure are single points on the periphery of the detailed projection surface 62. Then, looking from the center of perspective O, the detailed projection surface 62 projects the object that is present on the virtual plane 50 in the range of the angle C-O-E. In other words, objects that are arranged in the range of the line segment G-I in the figure on the virtual plane 50 located on the line of extension from the line segments O-C, O-E passing through the detailed projection surface 62, are projected onto the detailed projection surface 62 within the display surface 63.

Figure 5:
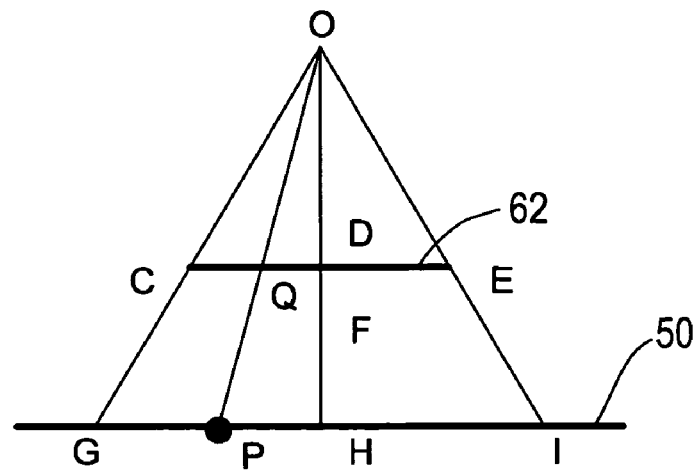
FIG. 5 is an explanatory diagram of a detailed projection surface corresponding to an operation region.

For example, as in FIG. 5, in a case where a point P on the virtual plane 50 is viewed from the center of perspective O, the point P on the virtual plane 50 is projected onto a point Q on the detailed projection surface 62. This point Q is covered into a point on the display surface 63 and displayed in the operation region 101 of the application window 41. It should be noted that, the coordinates on the detailed projection surface 62 are orthogonal coordinates taken along the long side (cross-section P-P) and the short side (cross-section Q-Q) shown in FIG. 4B and FIG. 4C.

The overview projection surface 61 is set on the angle A-O-C (angle B-O-E) which is determined based on the center of perspective O, and is a curved surface passing through the line segment A-C (B-E) in the FIG. 3. It should be noted that, A and B in FIG. 3 are single points on the periphery of the overview projection surface 61. Then, looking from the center of perspective O, the overview projection surface 61 projects the object that is present on the virtual plane 50 onto the display surface 63 in the range of the angle A-O-C (or the angle B-O-E). In other words, it can project all the objects on the virtual plane 50 that are not projected onto the detailed projection surface 62. Furthermore, as the position to which the object is projected approaches the display surface 63 (point A or B in the figure), it becomes possible to project objects which are present at positions limitlessly distant from the center of perspective O.

Figure 6:
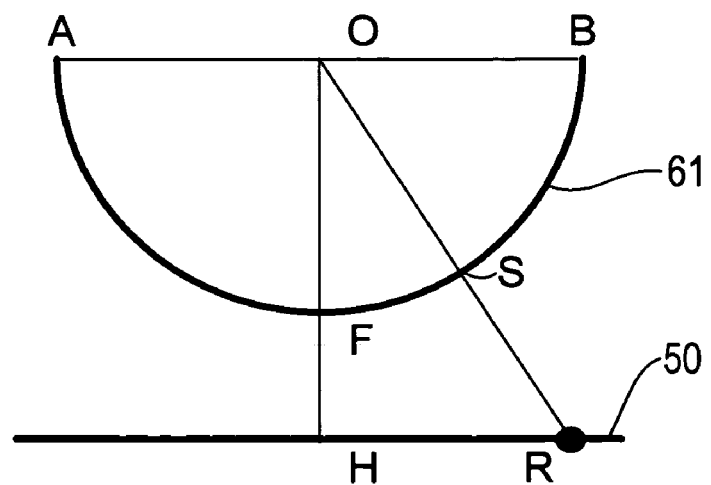
FIG. 6 is an explanatory diagram of an overview projection surface corresponding to an overview region.

For example, as in FIG. 6, in a case where a point R on the virtual plane 50 is viewed from the center of perspective O, the point R on the virtual plane 50 is projected onto a point S on the overview projection surface 61. This point S is projected onto the display surface 63 which is on a straight line EB', as shown in FIG. 3, and displayed in the overview region 102. It should be noted that, the coordinates on the overview projection surface 61 are orthogonal coordinates taken along the long-side (cross-section P-P) and the short side (cross-section Q-Q) shown in FIG. 4B and FIG. 4C after opening the overview projection surface 61 toward the display surface 63 as shown in FIG. 3.

Next, the object that is projected onto the display surface 63 via the overview projection surface 61, is displayed onto the overview region 102 of the application window 41. For example as shown in FIG. 2, it is displayed as the speck 104. In other words, in the overview region 102, only the presence of the object is displayed.

On the other hand, the object that is projected onto the display surface 63 via the detailed projection surface 62, is displayed on the operation region 101 of the application window 41. For example as the card object 103 shown in FIG. 2, it is displayed in a size large enough so that input operations and the like are possible.

In other words, in the overview region 102, the phases of the object's position information are displayed, and in a case where two pairs of two freely chosen points on the operation region 101 are taken, the ratio of the distances between these two points from the center of perspective O is the same on the display surface 63 and the operation region 101. By contrast, in the overview region 102, when one reference point (for example, the center of perspective O) and two freely determined points are taken, the relative size of the distances between the reference point and these two points is the same as on the display surface 63.

As described above, in the object categorization GUI of this invention, the object details are displayed on the operation region 101, and the operations can be performed on other object. In the overview region 102, the positional relationships of all the objects outside the operation region 101 are displayed as specks or other abstract figures. As described below, by moving the operation region 101 (in other words, the display surface 63 of the virtual projection body 60), many objects can be accessed.

It should be noted that, the display surface 63 and the application window 41 are not the same region. Therefore, a display unit 205 independently converts the position coordinates of the object arranged in the display surface 63, into two coordinate axes along a horizontal direction and a vertical direction of the display device 20.

<Details of the Object Categorization GUI>

Figure 7:
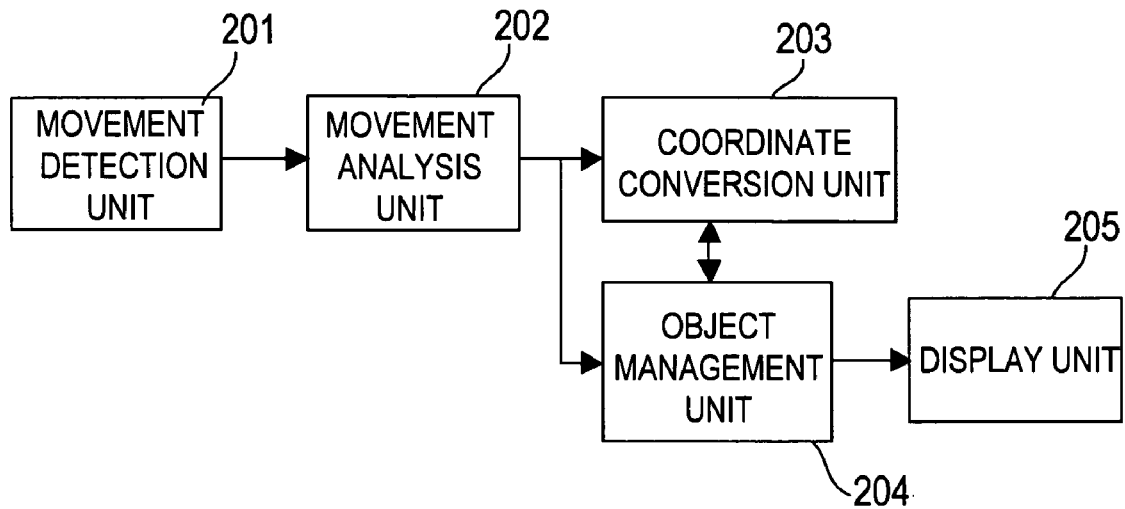
FIG. 7 is a functional block diagram showing a software construction of the object categorization GUI.

Next, explanation is given regarding a construction of the object categorization GUI, with reference to a block diagram in FIG. 7. The object categorization GUI is constructed with the following functional blocks.

Figure 8:
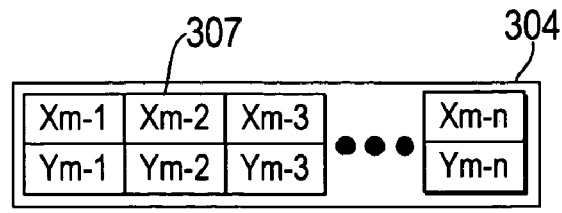
FIG. 8 is an explanatory diagram of a buffer storing position information of a mouse belonging to a movement detection unit.

A movement detection unit 201 receives, from the mouse 31 or other such pointing device, an input of position information and information regarding the button operation. Then, the movement detection unit 201 sends the position information from the mouse 31 to a movement analysis unit 202, and stores it in a buffer 304. It should be noted that, as shown in FIG. 8, for the position information, Xm axis and Ym axis coordinates (Xm-i, Ym-i) form one pair as position information 307, and a predetermined amount of position information is stored. Here, i is a natural number. It should be noted that, the contents in the buffer 304 are cleared at predetermined timing (such as at the time when a drag operation described below is completed, or the like).

Figure 9:
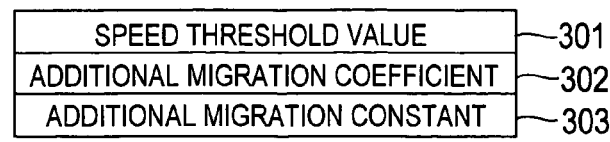
FIG. 9 is an explanatory diagram of each value which a movement analysis unit uses in flip operation processing.

The movement analysis unit 202 performs calculation of the migration speed and migration direction of the mouse 31, based on the inputted position information 307, and the calculated speed is compared with a speed threshold value, to determine whether or not the threshold value is exceeded. When the result of this determination is that the migration speed has exceeded the threshold value, flip processing (as described later) is performed to increase the migration amount of the mouse cursor 32 beyond the actual migration amount of the mouse 31. In order to perform this flip processing, the movement analysis unit 202, as shown in FIG. 9, holds a speed threshold value 301, an additional migration coefficient 302, and an additional migration constant 303. Then, in the flip processing, as described below, the actual migration amount of the mouse 31 is multiplied by the additional migration coefficient 302, and to this product the additional migration constant 303 is added to derive the additional migration position, thus achieving the calculation of the migration amount in the direction the mouse 31 is migrating.

A coordinate conversion unit 203 holds parameters pertaining to the above-mentioned projection system, and calculates the display position of the object that is arranged on the virtual plane 50. Furthermore, for converting the object's coordinates, the coordinate conversion unit 203 has a derivation method in a formula that operates by numerical calculation, such as a Newton method or the like.

Figure 10:
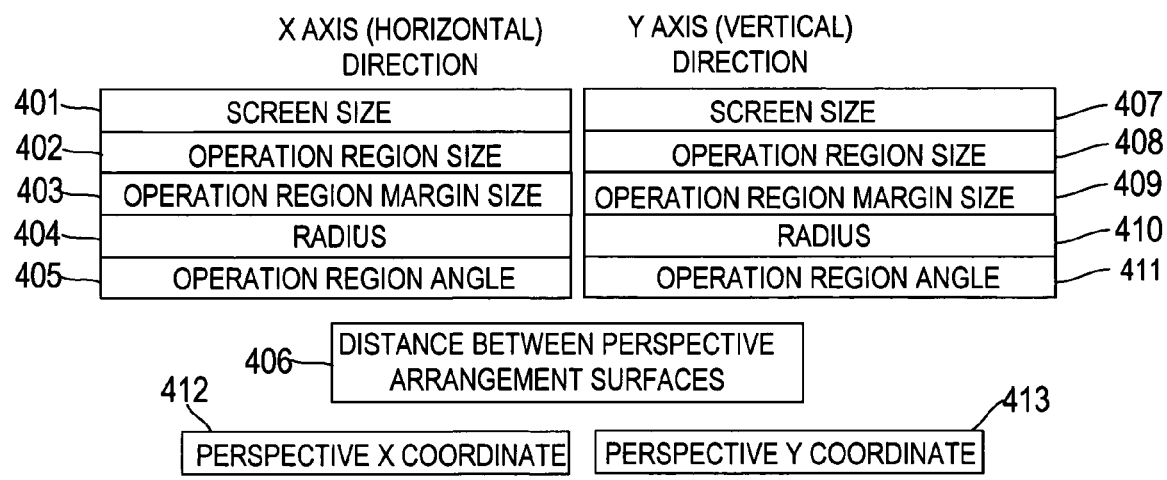
FIG. 10 is an explanatory diagram of values held by a coordinate conversion unit.

The coordinate conversion unit 203, as shown in FIG. 10, is provided with information about the application window 41 and the virtual projection body 60, which are shown in FIG. 3, for both the X axis and the Y axis respectively, which are shown in FIG. 3. It should be noted that, the X axis and the Y axis are different coordinate systems in the application window 41, in the display surface 63, and in the virtual plane 50, respectively.

In the present embodiment, the rectangular region is used as the operation region 101, and in order to perform the coordinate conversions for each coordinate axis, the display horizontal direction serves as the X axis and the display vertical direction serves as the Y axis, and parameters for the X axis and for the Y axis are held. Furthermore, since the center of perspective O is used as the point of origin, one-half values of the overall size are recorded.

In FIG. 10, for the screen size 401, 407, the X axis and the Y axis of the application window 41, which is a region used for the display, are shown in half measurements. For the operation region sizes 402, 408, the X axis and the Y axis of the operation region 101, which is inside the application window 41, are shown in half measurements. For the operation region margin sizes 403, 409, values produced by subtracting the size of the operation region 101 from one half the value of the size of the overview region 102 inside the application window 41, is recorded for the X axis, and for the Y axis.

Radii 404, 410 show rates of curvature of the overview projection surface 61, which constitutes a side of the virtual projection body 60 shown in FIG. 3. Operation region angles 405, 411 are values of the X axis and the Y axis of the angle C-O-D shown in FIG. 3. A distance between perspective arrangement surfaces 406 indicates the height from the virtual plane 50 to the display surface 63. A perspective X coordinate 412 and a perspective Y coordinate 413 show coordinates of the virtual plane 50 at the center of perspective O.

Figure 11:
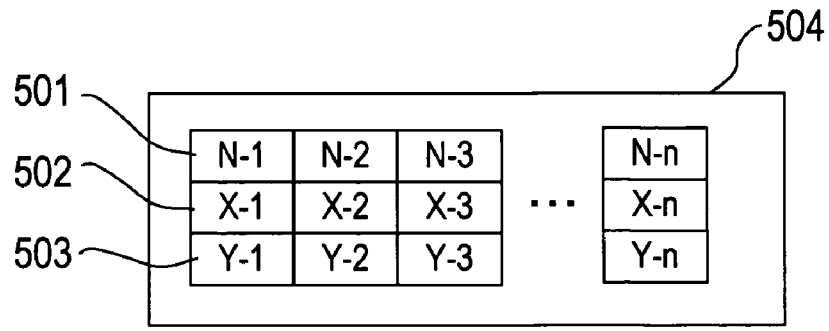
FIG. 11 is an explanatory diagram of position information of an object held by an object management unit.

Next, an object management unit 204 in FIG. 7 performs recording of information such as the object's position information and identifier and the like, and its arrangement position on the virtual plane 50. For example, like object management data 504 shown in FIG. 11, for all the objects, the object management unit 204 stores and manages the arrangement position X axis coordinate 502 and the arrangement position Y axis coordinate 503 on the virtual plane 50 corresponding to the object identifier 501.

A display unit 205 generates a display signal to the display device 20, and displays the application window 41, which is provided with the operation region 101 and the overview region 102, in the display region 20A.

<Coordinate Conversion between Virtual Plane and Display Surface>

Next, explanation is given below regarding the coordinate conversion that is performed by the coordinate conversion unit 203.

Figure 12:
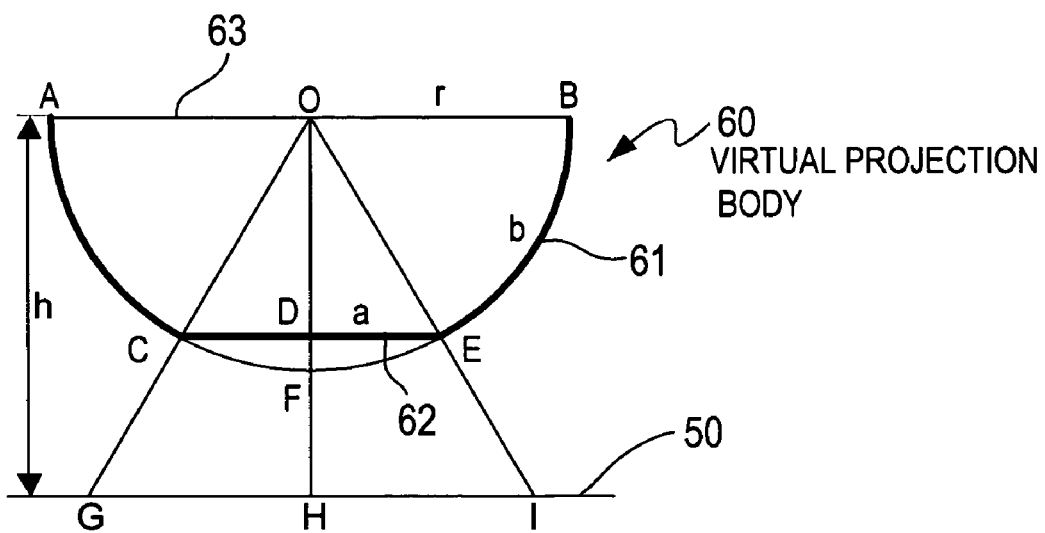
FIG. 12 is an explanatory diagram showing a relationship between a virtual projection body and a virtual plane, which make up the projection surface.

FIG. 12 shows parameters pertaining to the space at the time of the coordinate conversion. In FIG. 12, the radius r of the overview projection surface 61 of the virtual projection body 60 is defined as:

$$r=OB \qquad (1)$$

and this is stored as the radii 404, 410 in FIG. 10.

The operation region angle θ, in FIG. 12, is defined as:

$$\theta=EOD \qquad (2)$$

and θ is stored as the operation region angles 405, 411 in FIG. 10.

Next, the distance h between the perspective arrangement surfaces, in FIG. 12, is defined as:

$$h=OH \qquad (3)$$

and is stored in the distance between the perspective arrangement surfaces 406 in FIG. 10.

Between the operation region size a (402, 408 in FIG. 10) and the operation margin region size b (403, 409 in FIG. 10), the following relationship is true:

$$a=r \sin \theta, \ b=r(\pi/2-\theta) \qquad (4)$$

As described below, in a case where the operation region 101 migration, zoom in, or other such operations on the projection system are performed, for the coordinate conversion, r and θ from the relational formula (4) are calculated by numerical calculation methods.

Figure 13:
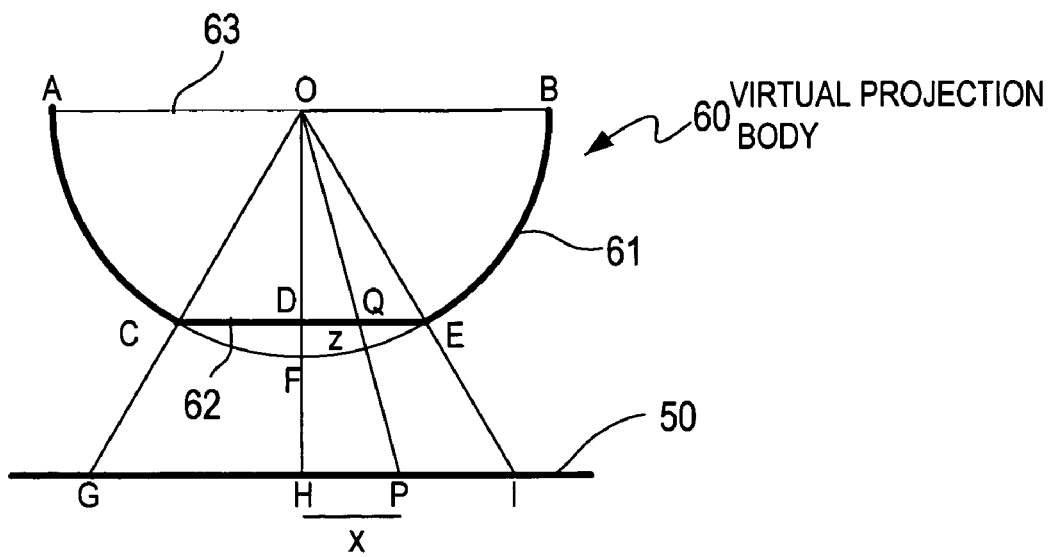
FIG. 13 is an explanatory diagram of when the object on the virtual plane is projected onto the detailed projection surface.

When the detailed projection surface 62 coordinate conversion is defined, as shown in FIG. 13, as:

$$x=HP, \ x'=z=DQ \qquad (5)$$

then the following relationship is true:

$$x/z=HI/a, \ HI=h \tan \theta \qquad (6)$$

Therefore, a point P on the virtual plane 50 is converted into a point Q on the detailed projection surface 62 by performing the following formula:

$$x'=z=ax/HI=ax/(h \tan \theta)=rx \cos \theta/h \qquad (7)$$

Furthermore, reverse conversion of the coordinates (from the detailed projection surface 62 to the virtual plane 50) can be given by means of the following formula:

$$x=hx'/(r \cos \theta) \qquad (8)$$

Figure 14:
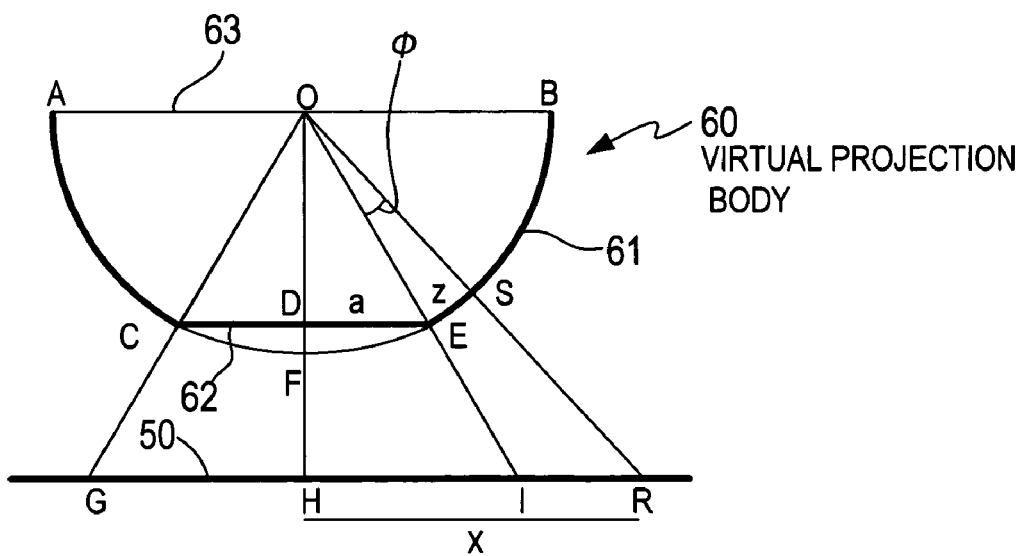
FIG. 14 is an explanatory diagram of when the object on the virtual plane is projected onto the overview projection surface.

Next, the calculation method for the overview region 102 coordinate conversion is shown. In FIG. 14, when the following is true:

$$x=HR, \ x'=a+z=DE+ES \qquad (9)$$

then the point R on the virtual plane 50 is converted into a point S on the projection surface by means of the following formula:

$$x'=a+r\phi=a+r[(\theta+\phi)-\theta]=a+r[\text{arc} \tan(x/h)-\theta] \qquad (10)$$

Furthermore, the reverse conversion from the overview projection surface 61, which is in the overview region 102, to the virtual plane 50 is given using the following formula:

$$x=h \tan\{(x'-a)/r+\theta\} \qquad (11)$$

Furthermore, a condition for the point on the projection surface to be included in the operation region 101 is given as:

$$x' \leq a \quad (12)$$

and a condition for the point on the virtual plane 50 to be projected onto the operation region 101 is given as:

$$x = ha/(r \cos \theta) \quad (13)$$

From the foregoing relational formulae, the coordinate conversion is performed between the virtual plane 50 and the display surface 63, via the projection surface. It should be noted that the X axis direction was described above, but similar computations may be performed for the Y axis direction as well.

<Processing Details>

Next, detailed explanation is given-regarding one example of processing of the object categorization GUI, with reference to the following flowcharts.

<Object Creation Processing>

Figure 15:
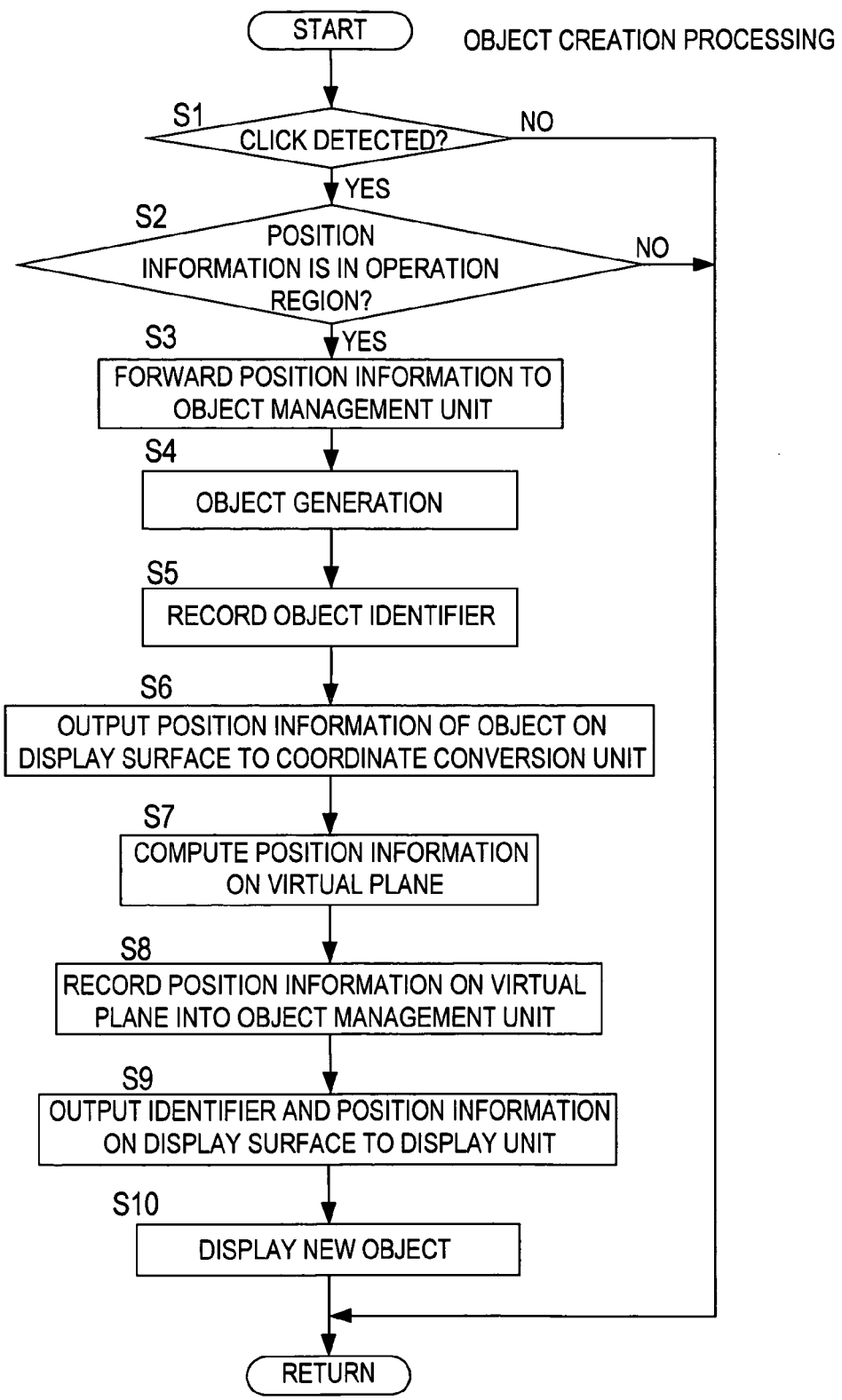
FIG. 15 is a flowchart showing an example of object creation processing.

FIG. 15 is a flowchart showing an example of processing at a time when making the object. This is executed at predetermined intervals (e.g., every several tens of milliseconds).

First, at S1, the movement detection unit 201 detects whether the mouse 31 button was clicked (the pointing device selection movement). In a case where it was clicked, the processing advances to S2. In a case where it was not clicked, the processing ends.

At S2, the position (the coordinates on the display region 20A of the display device 20) of the mouse cursor 32 is detected, to determine whether the detected position is on the object, and whether it is in the operation region 101 or in the overview region 102. If the determination result is that it is in the operation region 101 and that it is a coordinate where no object is present, then the processing advances to the object creation processing beginning from S3. In other words, the creation of the object is executed when the position of the mouse cursor 32 is in the operation region 101.

At S3, in the case where the click detection position is on the operation region, the position (X-Y coordinates) where the mouse cursor 32 was clicked is forwarded to the object management unit 204.

Next, at S4, in the object management unit 204 a new object is generated, and at S5 this object's identifier 501 is stored in the object management data 504.

At S6, the object management unit 204 sends the position information from the mouse cursor 32 to the coordinate conversion unit 203.

At S7, in the coordinate conversion unit 203, the position information (coordinates) of the mouse cursor 32 is converted into coordinates on the display surface 63, based on the above-mentioned coordinate conversion. Furthermore, by using the above-mentioned Formula (8), the coordinates on the display surface 63 are converted into coordinates on the virtual plane 50.

At S8, the object management unit 204 records the new object's coordinates on the virtual plane 50 in the object management data 504.

At S9, the identifier of the newly created object, and the coordinates (the mouse cursor 32 position) on the display region 20A are outputted to the display unit 205, and the display unit 205 displays the new object that was sent, inside the display region 20A of the display device 20, at the position of the mouse cursor 32 in the operation region 101 set inside the application window 41.

<Object Migration (Drag Operation and Flip Operation) Processing>

Figure 16:
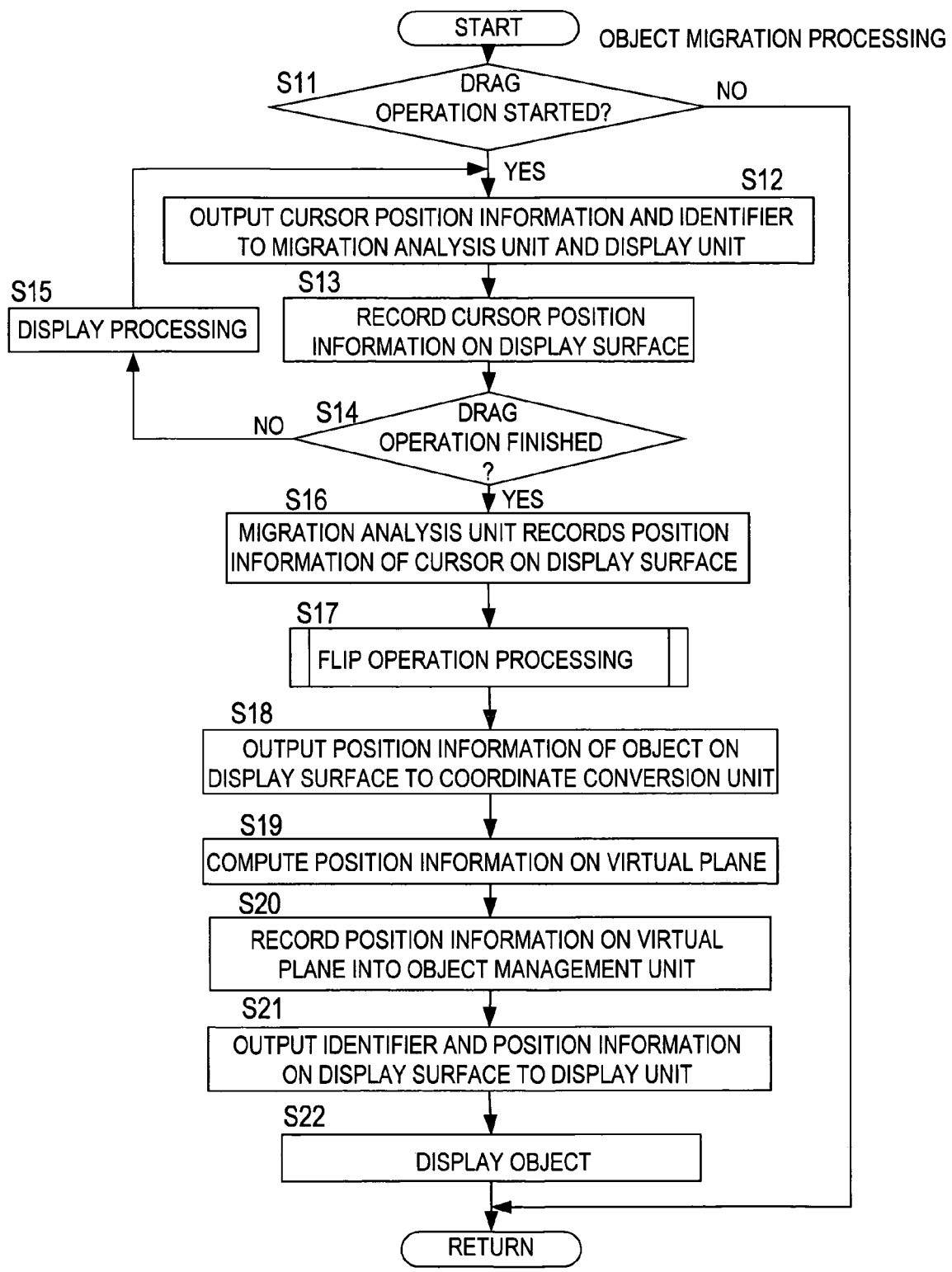
FIG. 16 is a flowchart showing an example of object migration processing.

Next, FIG. 16 shows processing in a case where the object is migrated by the drag operation (the operation of migrating the object while pressing the mouse 31 button). This processing is executed at predetermined intervals.

It should be noted that, in addition to the normal drag processing this processing includes flip processing, such that when the migration speed of the mouse 31 exceeds the predetermined threshold value, the migration amount of the object is set greater than the actual migration amount of the mouse 31, so that the object can be migrated far with a small mouse operation amount.

At S11, the movement detection unit 201 detects that the button on the mouse 31 was pressed and dragging of the objects has started. In the case where the drag operation was detected, the processing advances to S12, and when such is not detected the processing just ends there.

In S12, the position where the drag operation occurred (indicated by the mouse cursor 32 position information) and the identifier of the object being dragged, are sent to the movement analysis unit 202.

At S13, while the object is being dragged, the movement detection unit 201 sends the position information of the mouse cursor 32 to the movement analysis unit 202. It should be noted that, the movement analysis unit 202 stores the position information of the mouse cursor 32 into the buffer 304 shown in FIG. 8 at predetermined sampling intervals.

At S14, it is determined whether or not the drag operation has finished. If the drag operation is continuing, then the processing advances to S15, and the current position information of the mouse cursor 32 is outputted to the display unit 205, and the object being migrated is displayed in the operation region 101. In a case where the drag operation has finished (the button is released), the movement detection unit 201 informs the movement analysis unit 202 that the drag operation has finished, and the processing advances to S16.

At S16, the movement analysis unit 202, in flip processing which is described below, determines whether or not the flip operation was performed based on the migration condition of the mouse cursor 32, and calculates the position information in the application window 41 of the object after it has migrated, and sends this position information together with the object identifier to the object management unit 204.

At S17, the object management unit 204 sends, to the coordinate conversion unit 203, the position information of the object in the application window 41 after the drag operation or after the flip operation.

At S18, the coordinate conversion unit 203, as described above converts the coordinates of the object within the application window 41, into coordinates on the display surface 63, and furthermore, using the above-mentioned Formula (8), calculates the position information on the virtual plane 50 from the coordinates on the display surface 63, and sends this position information to the object management unit 204.

At S19, the object management unit 204 stores the position information on the virtual plane 50 indicated by the relevant object identifier 501, in the arrangement positions 502, 503.

At S20, the object management unit 204 sends the identifier 504 of the object, and the position information of the object within the application window 41, to the display unit 205.

At S21, the display unit 205 displays the object at its post-migration position in the application window 41.

Next, explanation is given regarding the flip operation processing performed at S17 in FIG. 16 mentioned above, with reference to FIG. 17 and FIG. 18.

Figure 17:
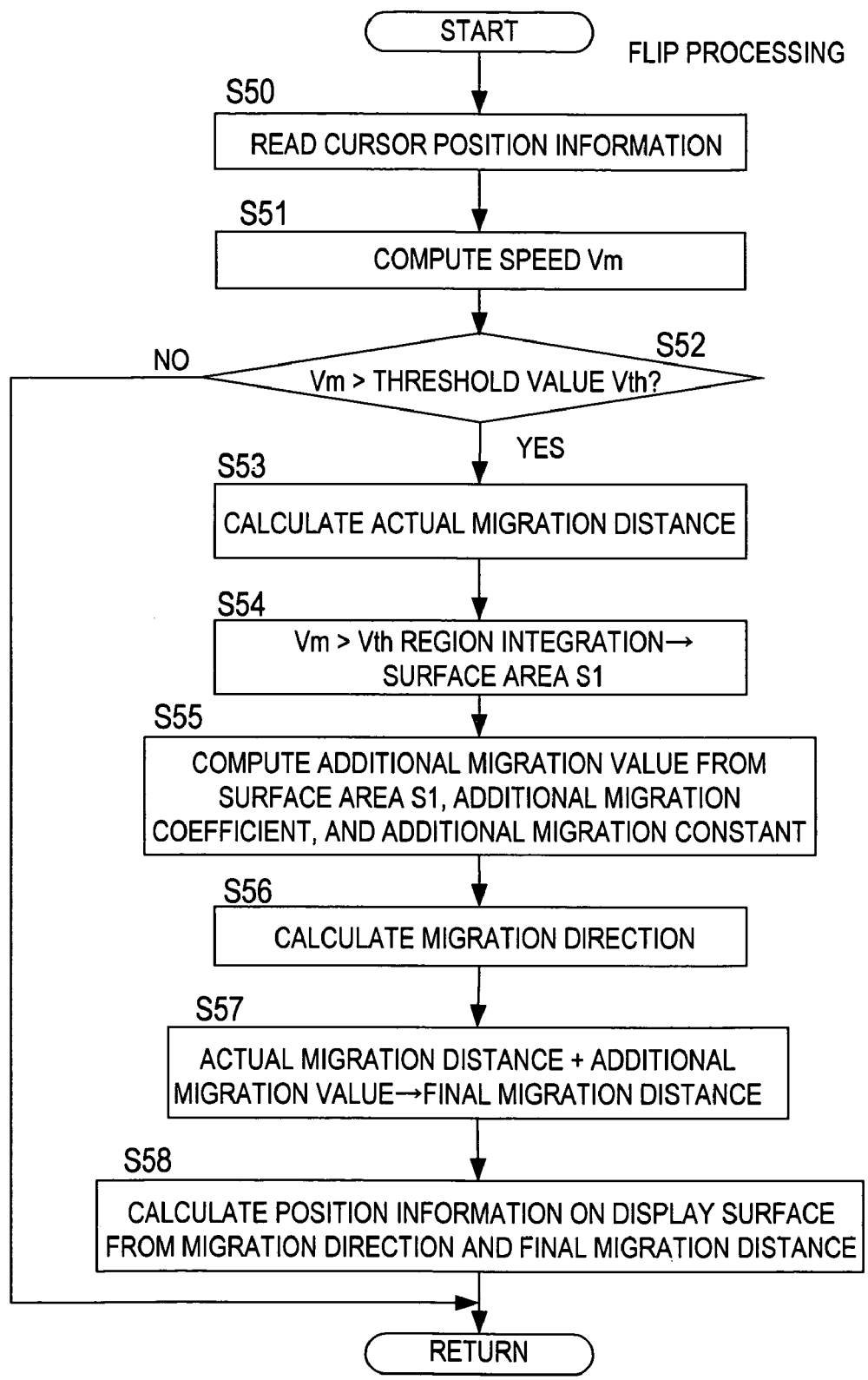
FIG. 17 is a flowchart showing an example of flip operation processing, which is performed in the object migration processing.
Figure 18:
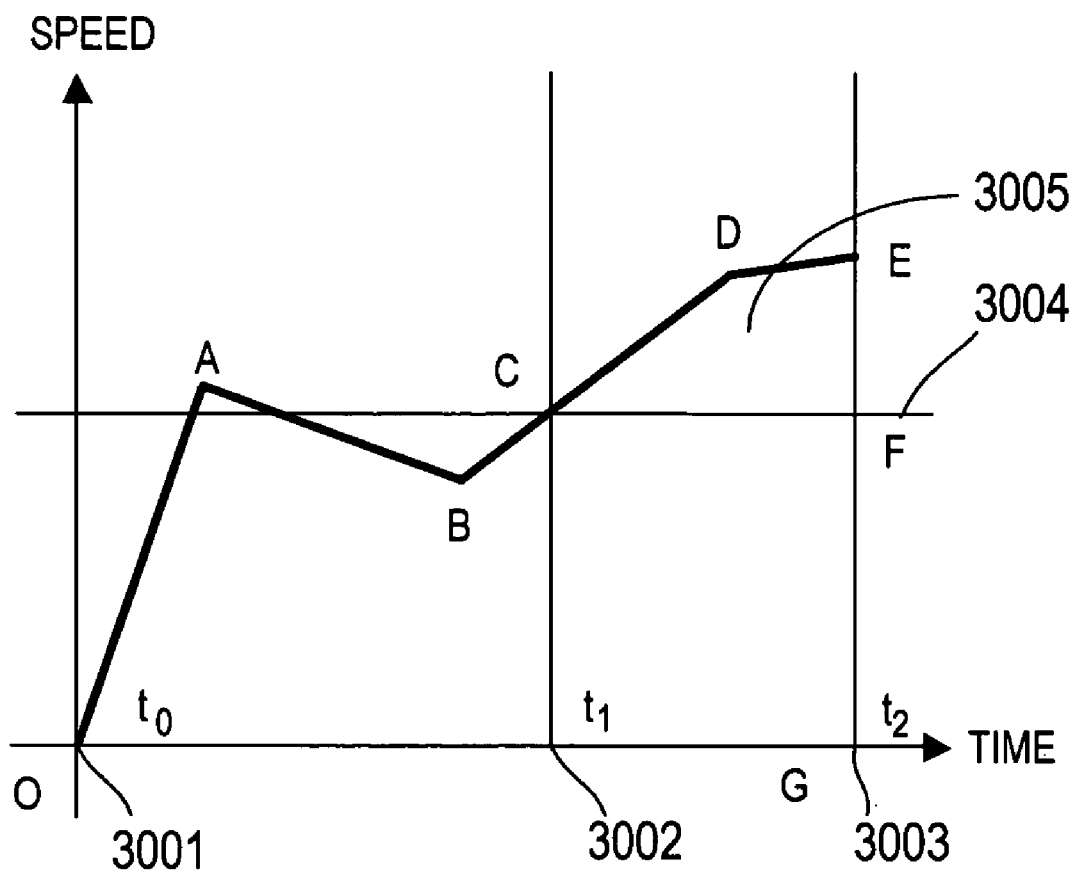
FIG. 18 is a graph showing an example of flip operation processing, showing a relationship between the speed of mouse cursor migration and time.

FIG. 17 shows a subroutine of the flip operation processing. FIG. 18 is a graph showing a relationship between the speed of the mouse cursor 32 during the drag operation period, and time.

First, at S50, the position information of the mouse cursor 32 is read from the buffer 304, and at S51, the migration speed Vm of the mouse cursor 32 is calculated from each of the coordinates (Xm-i, Ym-i). As a result of this, the relationship between the sampling intervals and speed of the mouse 31 can be represented as in FIG. 18.

Next, in S52, the speed threshold value 301 (Vth) in FIG. 9 and the speed Vm are compared, to determine whether the speed Vm has exceeded the threshold value Vth. It should be noted that, as an example, this comparison is performed by sequentially comparing the speeds Vm that were obtained at the above-mentioned S51 from the first one.

In the case where the speed Vm exceeds the threshold value Vth (F in FIG. 18), the processing advances to S53 and the following, and the flip operation processing is executed. Otherwise, it is determined to be the drag operation and the subroutine ends.

At S53, the actual migration distance is calculated from the mouse cursor 32 migration start point (Xm-1, Ym-1) and end point (Xm-n, Ym-n).

Next, at S54, time t1 is obtained, which is the time that is closest to the drag operation end time t2, and is also when the speed Vm exceeded the speed threshold value Vth. Then, during the period from time t1 to t2, the region that was exceeding the speed threshold value Vth is integrated.

For example, in the example in FIG. 18, at chronological point A in the figure, and at chronological point C in the figure, the speed Vm is exceeding the speed threshold-value Vth. In this case, during the period when the speed Vm exceeded the speed threshold value Vth, the point in time which is closest to the drag operation end time, is the chronological point t1 at C in the figure. Then, the region where the speed threshold value Vth is exceeded is the shape that is surrounded by CDEF in the figure. This region is integrated and serves as surface area S1.

Then, at S55, surface area S1 of the region exceeding the speed threshold value Vth is transformed linearly using the additional migration coefficient 302 and the additional migration constant 303 in FIG. 9 mentioned above, to calculate the additional migration value.

At S56, the migration direction of the mouse cursor 32 is calculated. To calculate the migration direction, for example, from the mouse cursor 32 end point (Xm-n, Ym-n) and the immediately previous coordinates (Xm-(n-1), Ym-(n-1)), the migration direction may be calculated based on the amount of change in the X axis and the Y axis.

At S57, the sum from adding the above-mentioned additional migration value obtained at S55 to the actual migration distance, serves as the final migration distance of the object.

At S58, the sum from adding together the migration start point of the mouse cursor 32 (Xm-1 , Ym-1 ), and the migration direction obtained at S56 and the final migration distance from S57, is calculated to serve as the object's position information.

Due to the above-mentioned flip operation processing, when the speed of the drag operation exceeds the threshold value Vth, by means of the additional migration coefficient 302 and the additional migration constant 303, the actual migration amount of the mouse cursor 32 is multiplied by the additional migration value, and the object moves by jumping far away from the mouse cursor 32. This is called the flip operation.

Figure 19:
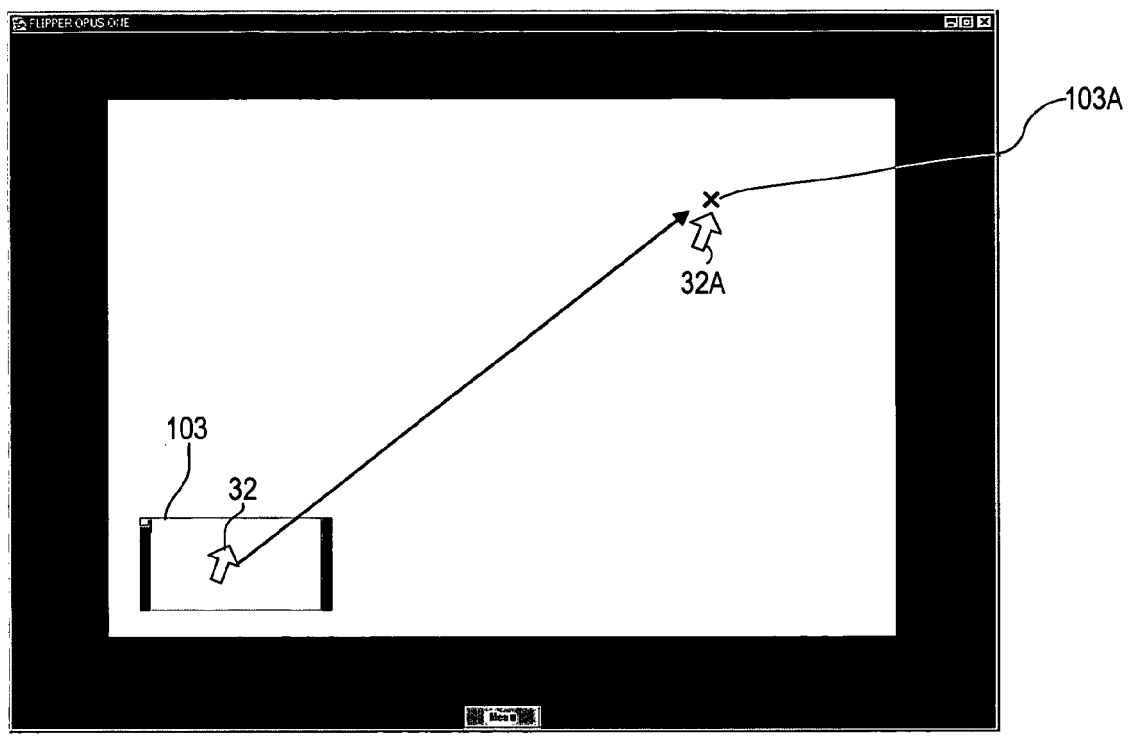
FIG. 19 is an explanatory diagram showing a drag operation in the operation region.
Figure 20:
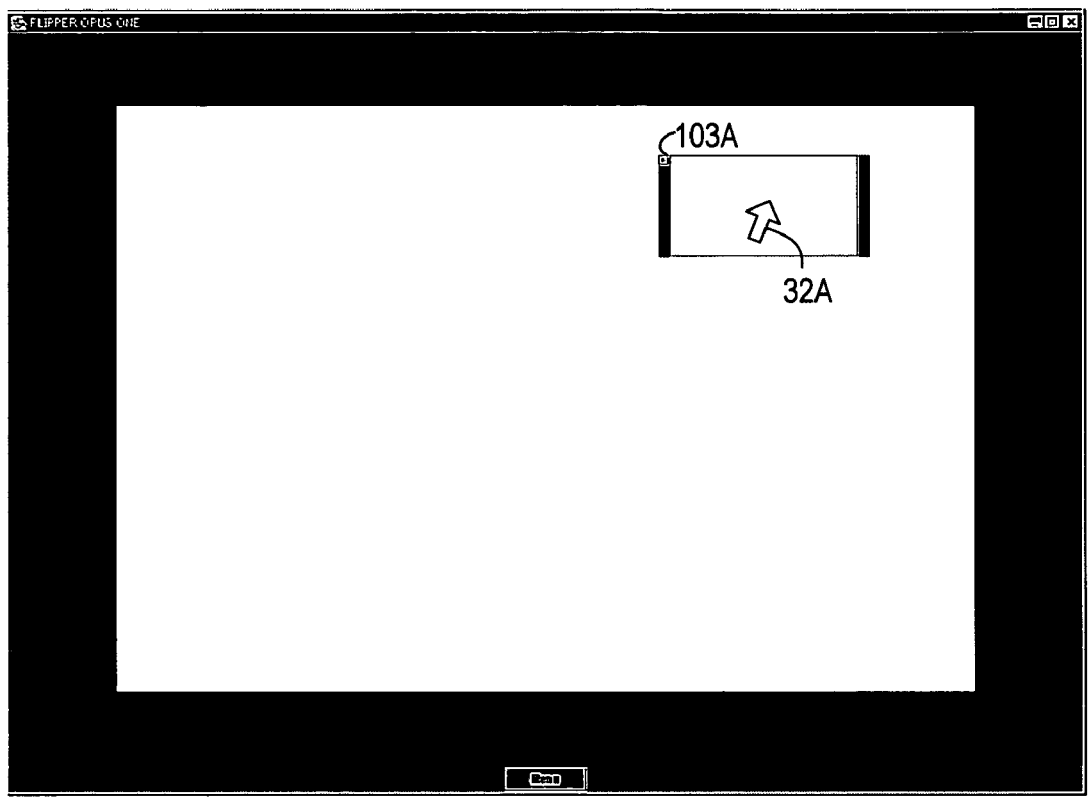
FIG. 20 is an explanatory diagram showing a state in the operation region when the drag operation is completed.

Next, differences between the drag operation and the flip operation are explained, with reference given to the drawings. FIG. 19 and FIG. 20 show an example of the drag operation. In FIG. 19, the mouse cursor 32 migrates from the start point at the bottom left, to the end point 32A at the top right. In this operation, the migration speed Vm of the mouse cursor 32 does not exceed the threshold value Vth, so the object 103 migrates to the mouse cursor end point 32A (103A).

Figure 21:
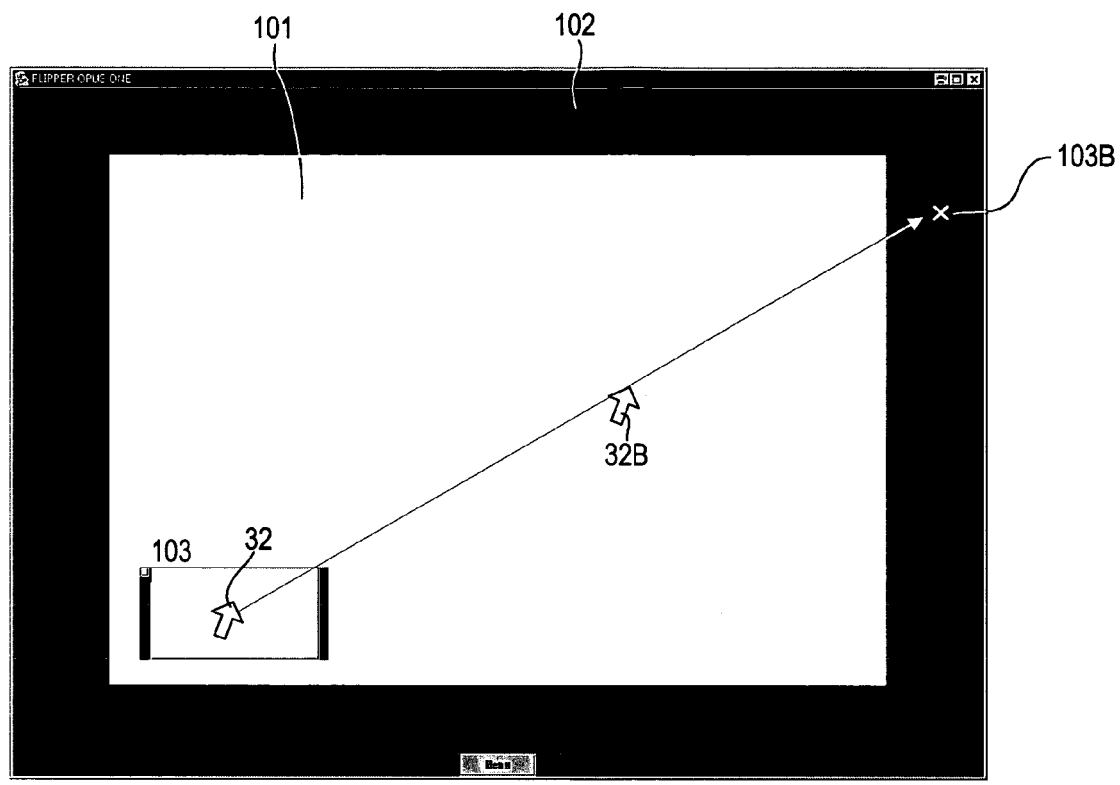
FIG. 21 is an explanatory diagram showing the flip operation in the operation region.
Figure 22:
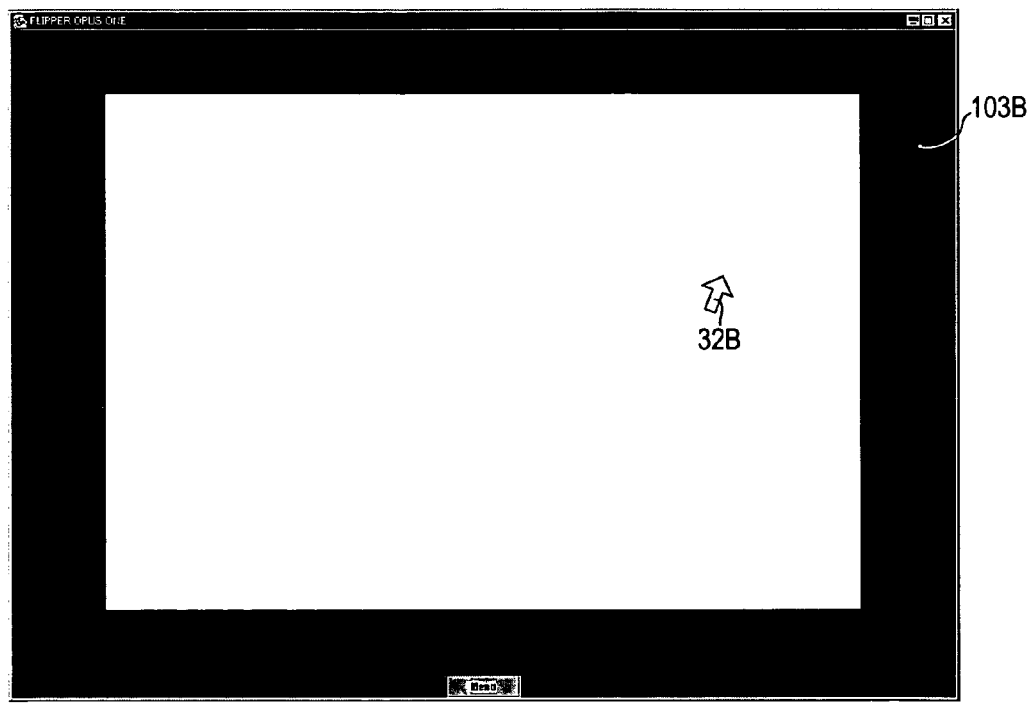
FIG. 22 is an explanatory diagram showing a state when the flip operation is completed.

FIG. 21 and FIG. 22 show an example of the flip operation. In this case, the mouse cursor 32 migrates from the start point on the bottom left, to the end point on the top right, and also the mouse cursor 32 migration speed Vm has exceeded the threshold value Vth.

Since the migration speed Vm of the mouse cursor 32 has exceeded the threshold value Vth, the additional migration value is computed, and the sum from adding the additional migration value to the actual migration distance of the mouse cursor 32 becomes the migration amount of the object.

In FIG. 21 and FIG. 22, the mouse cursor 32 migrates from the bottom-left start point to the upper-right central portion 32B, at a fast speed that exceeds the threshold value Vth. The object 103 migrates to 32B in the figure together with the mouse cursor 32, but after that it continues migrating by itself, to the overview region 102 at 103B in the figure. In other words, beyond the mouse cursor 32 end-point 32B, the object 103 jumps.

In this flip operation, the additional migration value based on the integrated value of the period when the migration speed Vm of the mouse cursor 32 was exceeding the speed threshold value Vth, is added to the actual migration amount of the mouse cursor 32, therefore the operator can adjust the additional migration value of the object 103 by adjusting the migration speed Vm of the mouse cursor 32, and thus the flip operation can be performed easily.

<Processing to Modify the Parameters of the Projection System>

<Migration of the Center of Perspective>

The parameters of the projection system can modify the position of the center of perspective O, and can perform zooming in and zooming out and the like. In these operations, migration is performed by clicking the mouse 31 on the overview region 102, or modifications are made by direct input from a menu.

Hereinafter, when the overview region 102 is clicked, the following sequence is followed, to change the positions of the perspective 412, 413.

Figure 23:
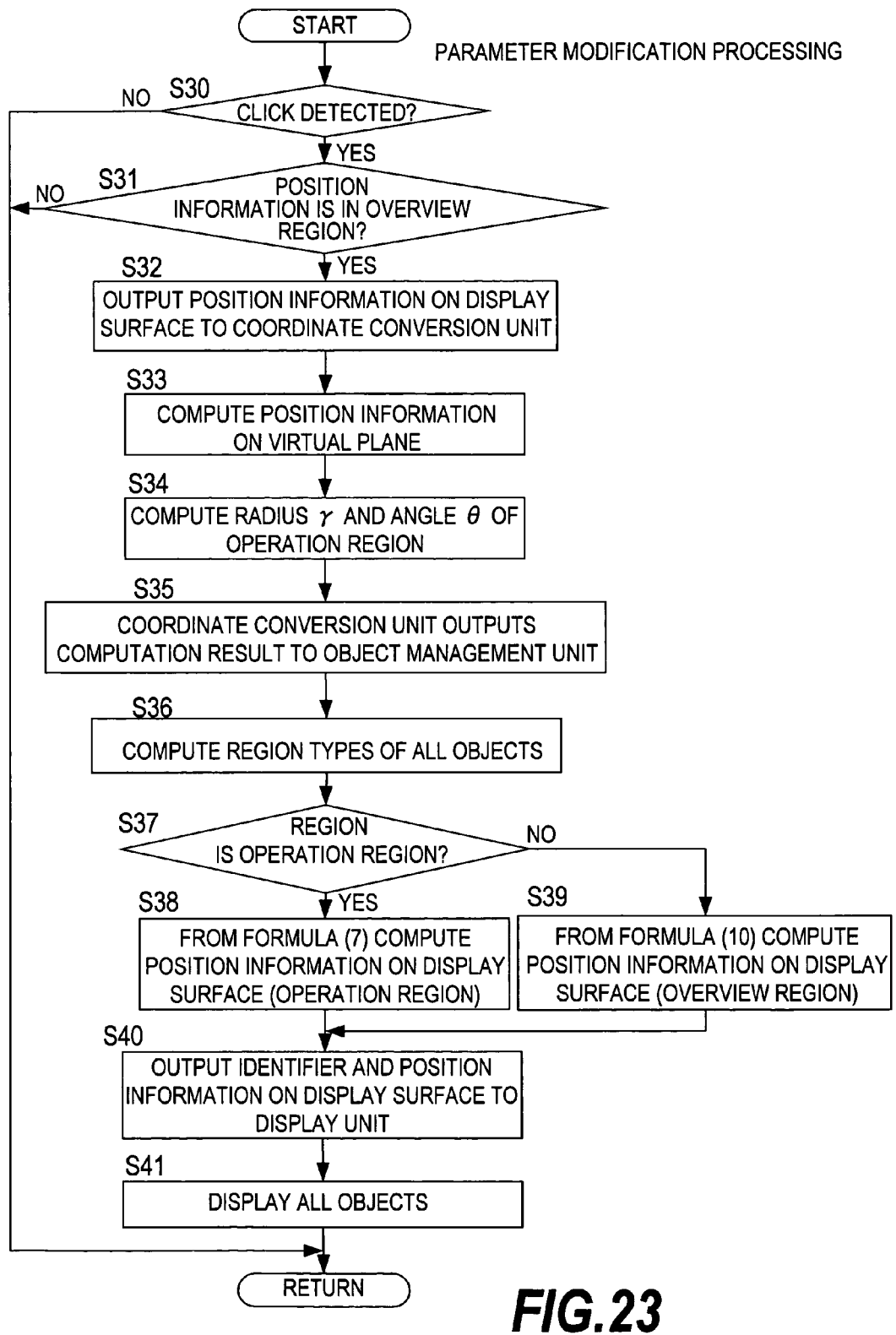
FIG. 23 is a flowchart showing an example of parameter modification processing.

FIG. 23 is a flowchart showing an example of processing for migrating the center of perspective O, which is one type of projection system parameter modification.

At S30, the movement detection unit 201 determines whether or not the button of the mouse 31 was clicked. In a case where it was clicked, the processing advances to S31, to distinguish whether the mouse cursor 32 detection position is on the overview region 102. If it is on the overview region 102, the processing advances to S32, and the position information of where the click occurred on the projection surface (the overview projection surface 61) is sent to the coordinate conversion unit 203.

At S33, the coordinate conversion unit uses the above-mentioned Formula (8) to calculate the position information on the virtual plane 50, and stores that value in the perspective X coordinate 412, and the perspective Y coordinate 413.

At S34, the radii 404, 410 and the angles 405, 411 of the operation region 101 are recalculated based on the above-mentioned Formula (4).

At S35, the coordinate conversion unit 203 sends the parameter modifications to the object management unit 204.

At S36, the object management unit 204 obtains the arrangement positions (the coordinates on the virtual plane 50) of all the objects, and uses the above-mentioned Formula (13) to distinguish the region type where each object is displayed. In other words, it is determined whether or not each object 103 is displayed in the operation region 101.

Then, at S37, the region where each object 103 is displayed is determined. In the case where the object is displayed in the operation region 101 the processing advances to S38, and in the case where the object is displayed in the overview region. 102 the processing advances to S39.

At S38, for the object displayed in the operation region 101, the above-mentioned Formula (7) is used to calculate the position information on the display surface 63, and this position information is sent to the object management unit 204.

At S39, for the Object displayed in the overview region 102, the above-mentioned Formula (10) is used to calculate the position information on the projection surface (the display surface 63), and this position information is sent to the object management unit 204.

Then, at S40, the object management unit 204 sends the projection surface position information that was received, and the object identifier, to the display unit 205.

At S41, the display unit 205 executes the display of each of the objects.

It should be noted that, each type of processing at the above-mentioned S36-S41 is performed for all of the objects, each respectively.

Figure 24:
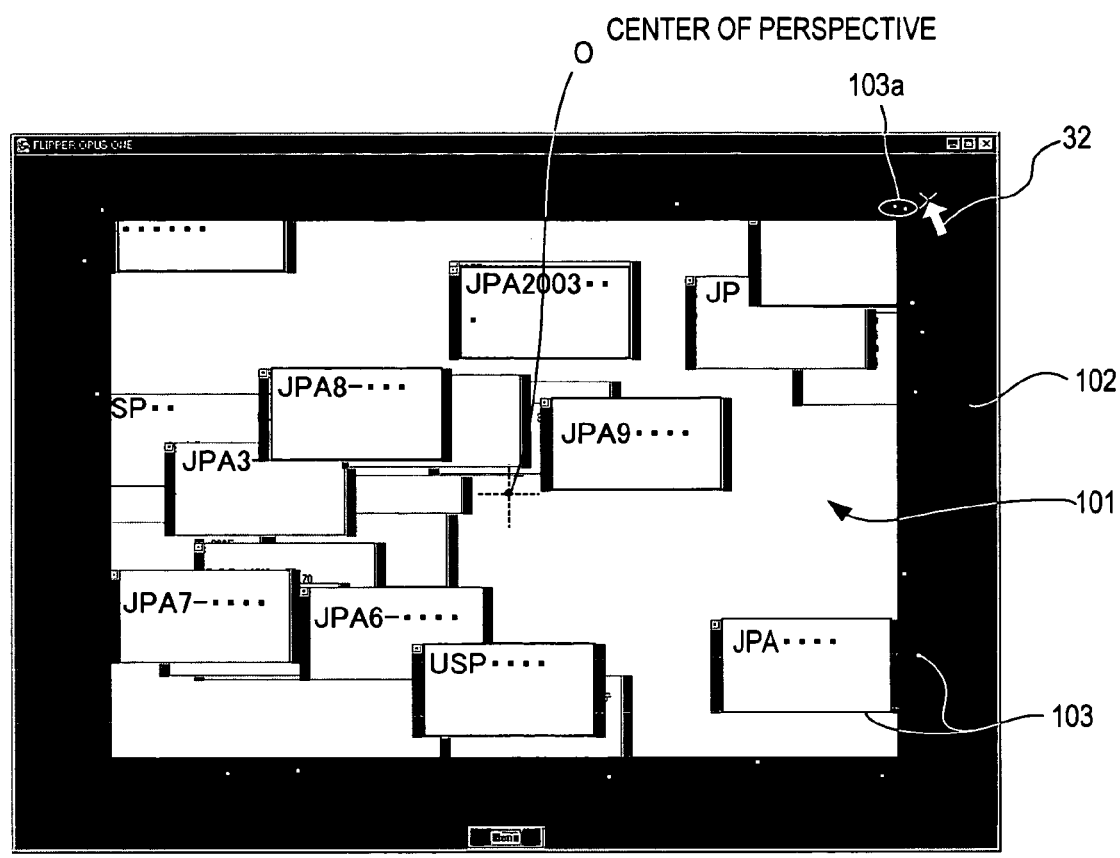
FIG. 24 is an explanatory diagram showing migration processing in the operation region, showing a state in an application window before the migration.
Figure 25:
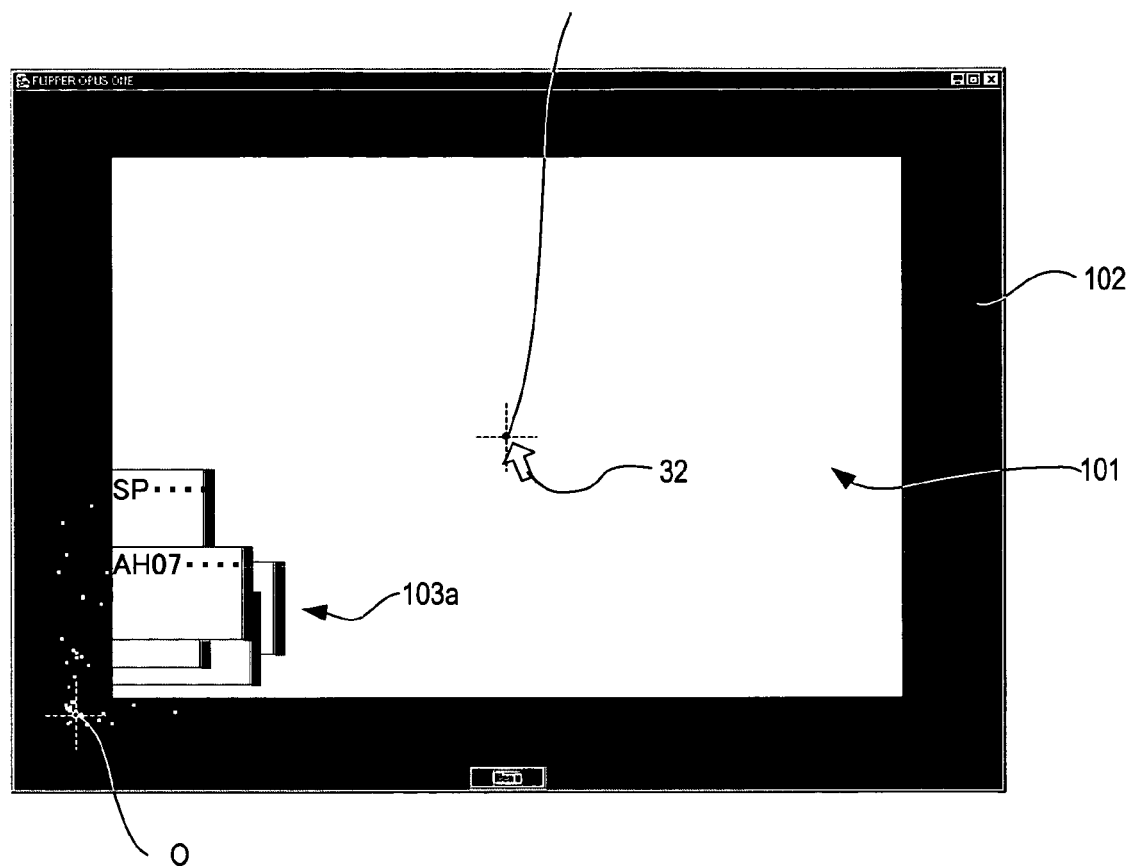
FIG. 25 is an explanatory diagram showing a state of the application window in a state when the migration processing in the operation region is completed.

FIG. 24 and FIG. 25 are referenced to explain the migration of the center of perspective O, which is performed by clicking on the above-mentioned overview region 102.

FIG. 24 shows the status before the perspective is migrated. The center of perspective O is at a position where many objects 103 are present. At this time, the mouse cursor 32 is migrated to the top right of the overview region 102, and the mouse is clicked in the vicinity of the object 103a.

Due to this click operation, the processing in the above-mentioned FIG. 23 is performed, whereby the coordinates of the center of perspective O are changed to the position where the mouse was clicked, and the coordinates of the object on the display surface 63 are recalculated.

As a result of this, a new center of perspective O' migrates to the coordinates on the virtual plane 50 indicated by the mouse cursor 32, and the positions of the objects 103 in the operation region 101 and in the overview region 102 are updated. The object 103a that was in the overview region 102 before the migration is located at the bottom left of the operation region 101 and the original center of perspective O is in the bottom left of the overview region 102 after the migration as shown in FIG. 25.

Figure 26:
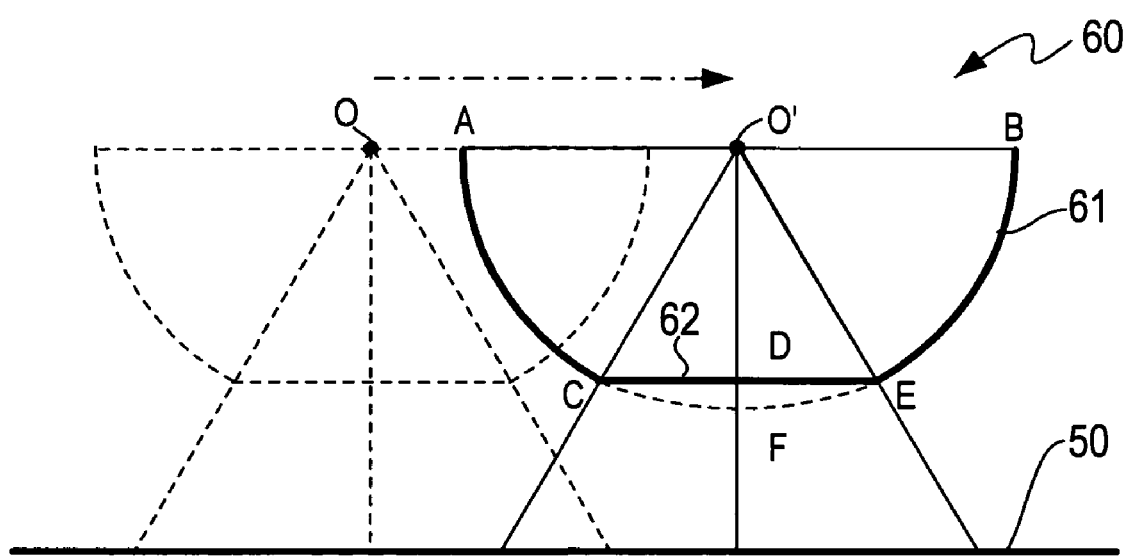
FIG. 26 is an explanatory diagram showing migration processing in the operation region, showing a relationship between the virtual projection body and the virtual plane.

In other words, as shown in FIG. 26, the virtual projection body 60, where the object 103 from the virtual plane 50 is projected, migrates across the virtual plane 50, and due to this migration, the region that is projected on the detailed projection surface 62 changes. It should be noted that, in FIG. 24 and FIG. 25, the centers of perspective O, O' were displayed for purpose of the explanations, but in practice the center of perspective O is not displayed.

<Zoom In/Zoom Out>

In the flowchart in FIG. 23, the migration of the center of perspective O was mentioned, but instead of changing the coordinates of the center of perspective O, when the distance between perspective arrangement surfaces h is changed, and the coordinates of the object 103 on the display surface 63 is recalculated, then zoom in/zoom out can be performed.

Figure 27:
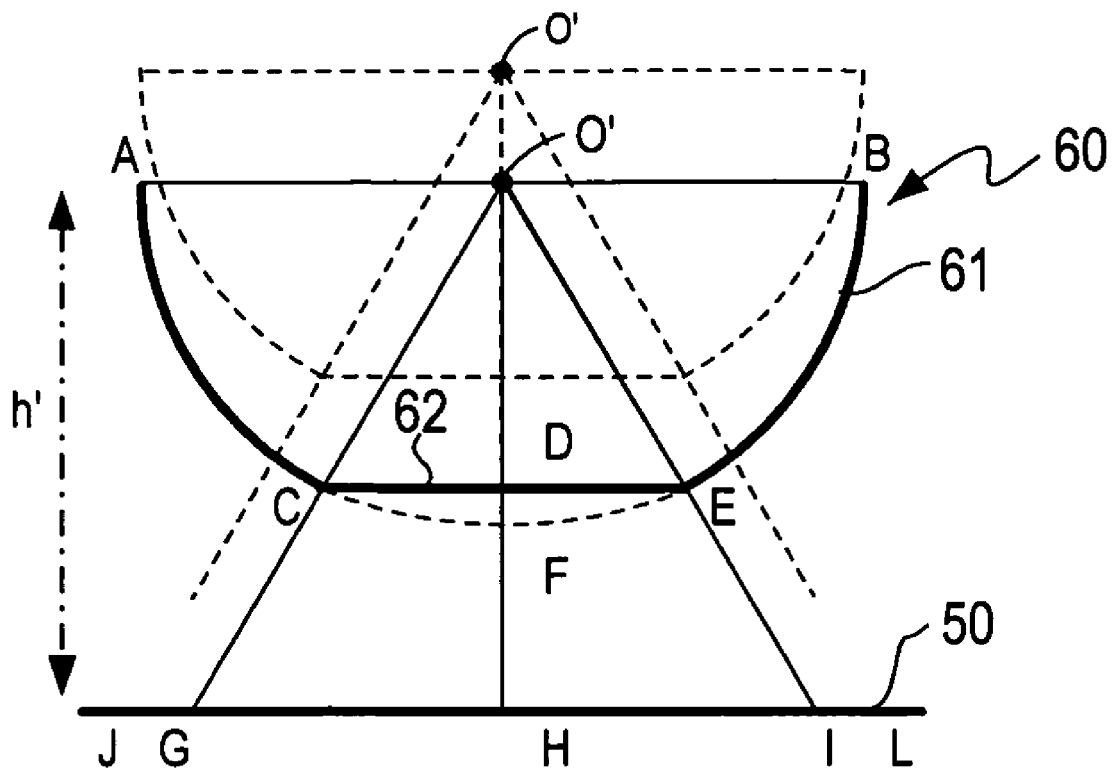
FIG. 27 is an explanatory diagram showing zoom in processing, showing a relationship between the virtual projection body and the virtual plane.

FIG. 27 shows an example of zooming in. By bringing the projection system (the virtual projection body 60) closer to the virtual plane 50, the virtual plane 50 corresponding to the operation region can be made smaller, and the magnification of the figures displayed onto the operation region 101 can be made greater. This operation is called the zoom in operation. By contrast, an operation of distancing the projection system from the virtual plane 50 is called the zoom out operation.

In FIG. 27, the virtual projection body 60, which is indicated by the broken line, is brought closer to the virtual plane 50 by an amount $\Delta h$, and is moved to the position of the virtual projection body 60, which is indicated by the solid line, whereby the range on the virtual plane 50 that is projected on the projection surface of the operation region 101 is reduced from line segment JL to line segment GI in the figure.

Due to this zoom in operation, an extremely small region on the virtual plane 50 can serve as the operation region, and greater detail of the object 103 can be displayed. When performing this zoom in/zoom out operation, the value of the distance between perspective arrangement surfaces 406 in FIG. 10 is modified.

Figure 28:
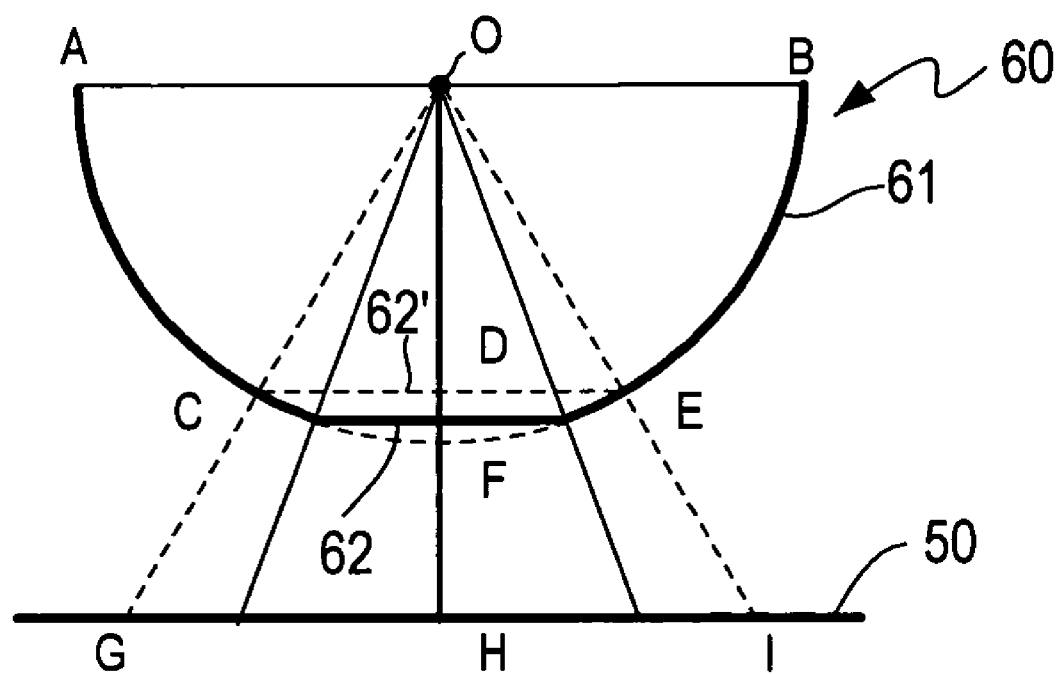
FIG. 28 is an explanatory diagram also showing the zoom in processing, showing the relationship between the virtual projection body and the virtual plane, due to region modification in the detailed projection surface.

According to this invention, as shown in FIG. 28, the size of the detailed projection surface 62 of the operation region 101 can be modified, and by this operation the zooming in/zooming out can be achieved as well.

The detailed projection surface 62 indicated by the solid line in the operation region 101 is reduced from the line segment CE (the detailed projection surface 62') indicated by the broken line. The size of the corresponding virtual plane 50 region also changes. Here, by setting the size of the detailed projection surface 62 of the operation region 101 to zero, the virtual projection body 60 in FIG. 4A is left with only the overview region 102, and a display of only the overview region 102 can be obtained.

When the size of the detailed projection surface 62 of the above-mentioned operation region 101 is modified, the operation region size 402, or 408, which is shown in FIG. 10, is modified.

<Modification of the Overview Region>

Figure 29:
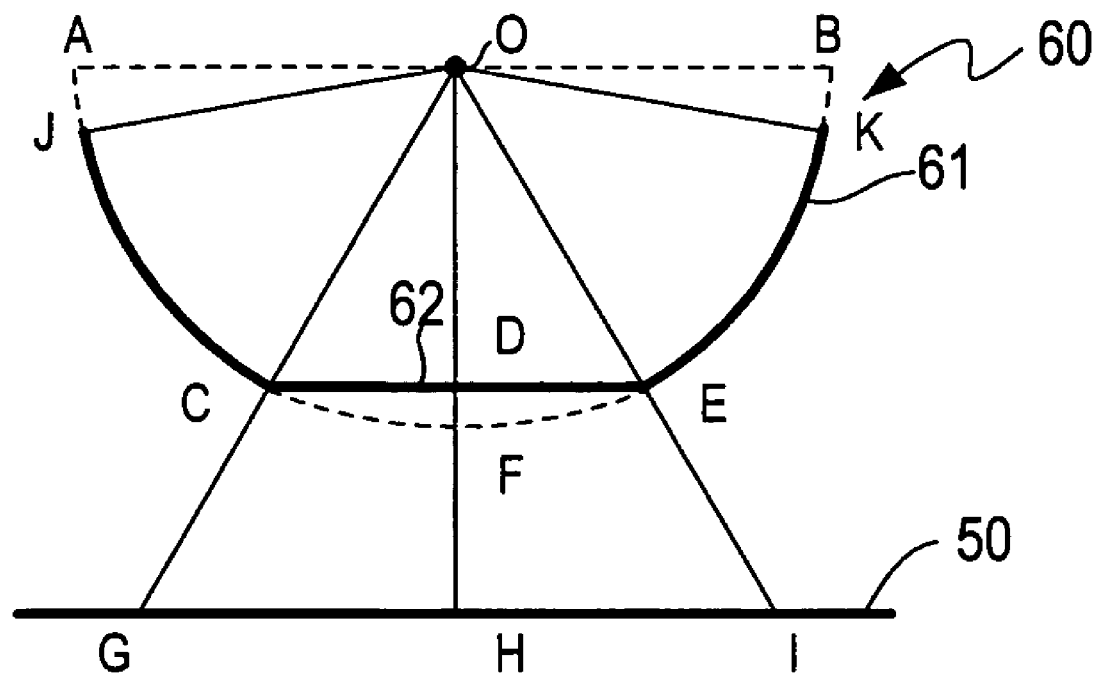
FIG. 29 is an explanatory diagram showing reduction of the overview projection surface, showing the relationship between the virtual projection body and the virtual plane.

FIG. 29 shows an operation for modifying the size of the overview region 102. In FIG. 29, an arc AC which indicates the overview projection surface 61 of the overview region 102 is reduced to an arc JC. Similarly, an arc BE is reduced to an arc KE. This operation stops the display of any object that is projected on the arc AJ and the arc BK. In other words, the region near the infinity distance of the virtual plane 50 disappears, and merely a limited region is left.

Here, the size of the overview projection surface 61 of the overview region 102 becomes zero, whereby it becomes possible to obtain a display of merely the operation region 101, which corresponds to the detailed projection surface 62 in FIG. 4A.

When modifying the size of the overview region 102, the screen size 401, or 407, which is shown in FIG. 10, is modified. As a result of this modification, the operation region margin size 403, or 409, is modified.

<Example of Object Operation>

Next, explanation is given regarding an example of operation inside the application window 41, using the card type object 103 shown in FIG. 2.

In this example, explanation is given regarding an example of an operation pertaining to a task, in which a concept search for the object 103 is performed and the search request is categorized.

Figure 30:
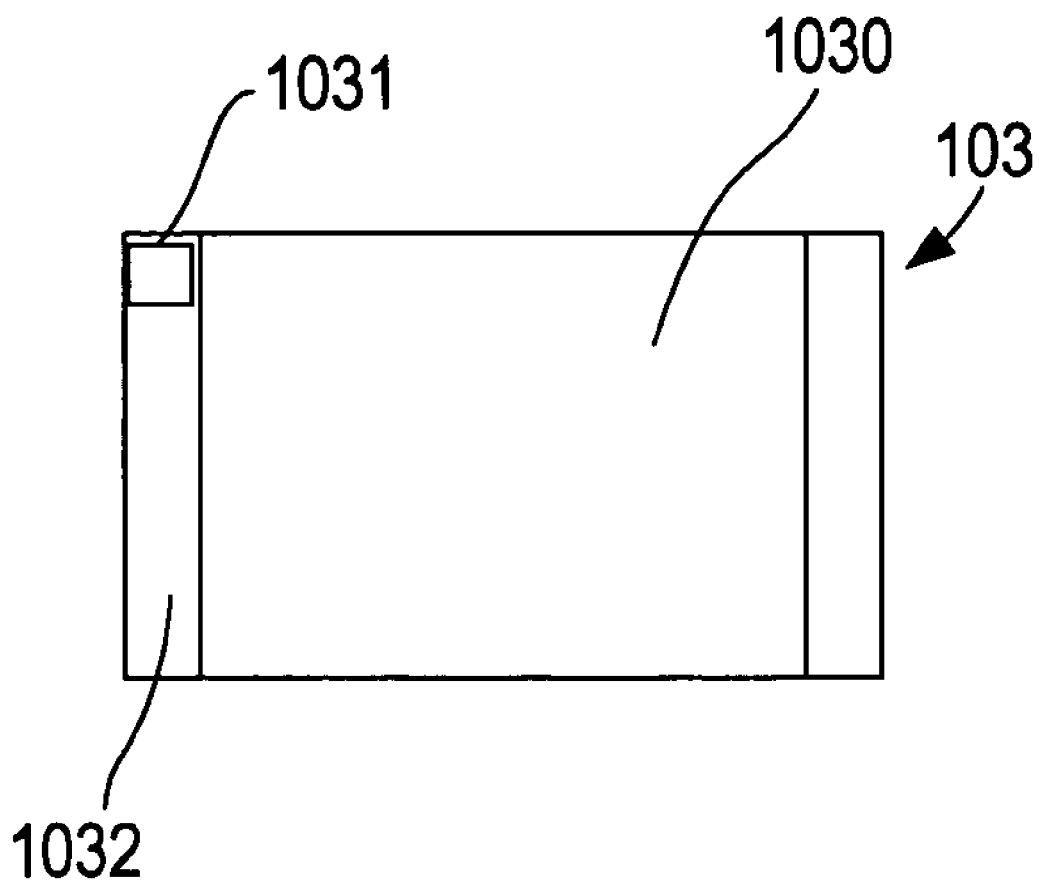
FIG. 30 is an elevation diagram of a card-type object.

FIG. 30 is a card-type object 103 used in the search. In a central portion of the object 103, an input/output region 1030 that is white in the diagram is provided. This input/output region 1030 is a region for inputting a search text, and displaying text resulting from the search.

On the left and right of the input/output region 1030, there is provided an operation bar 1032 for performing the above-mentioned drag operation and flip operation.

On the upper left of the object 103, there is provided an execute button 1031. By pressing the button 1031 with the mouse cursor 32, a predetermined function is executed. In this embodiment, the button 1031 is pressed to execute the concept search based on the content written in the input/output region 1030.

Figure 31:
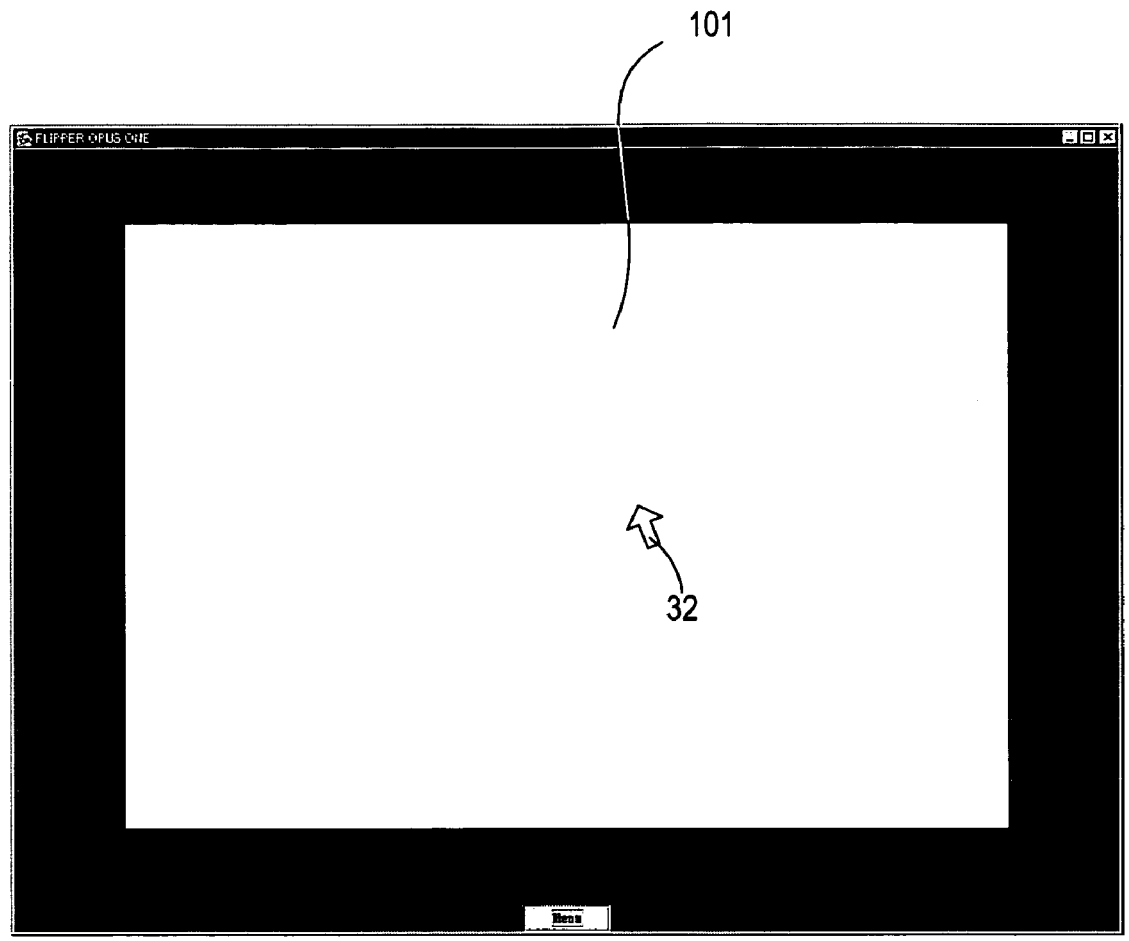
FIG. 31 is an explanatory diagram showing an initial screen of the application window where a concept search is performed with the card-type object.
Figure 32:
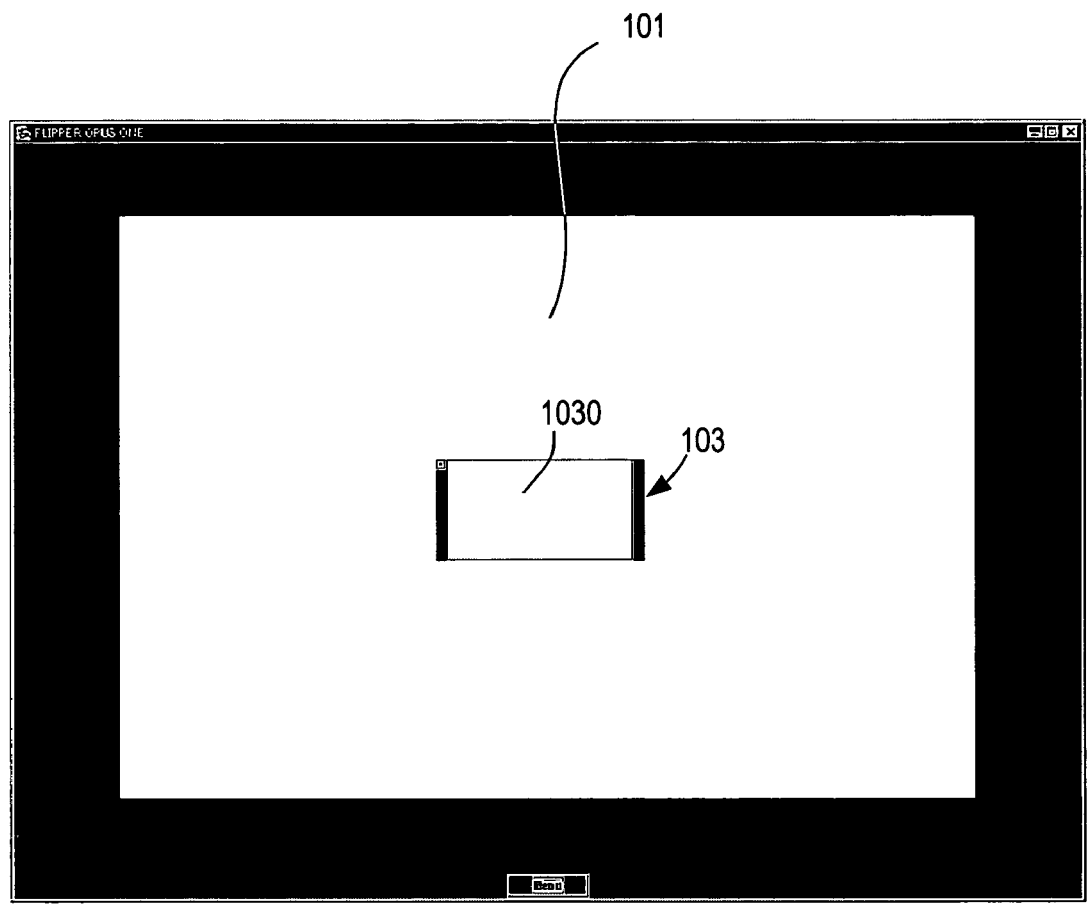
FIG. 32 is an explanatory diagram of the application window in a state where the card-type object has been created.

FIG. 31 is the initial state of the concept search. With the object 103 not being displayed in the operation region 101, any position in the operation region 101 can be clicked. This click operation causes the empty card-type object 103, in which noting is written in the input/output region 1030, to be displayed in the center of the operation region 101 as shown in FIG. 32.

Figure 33:
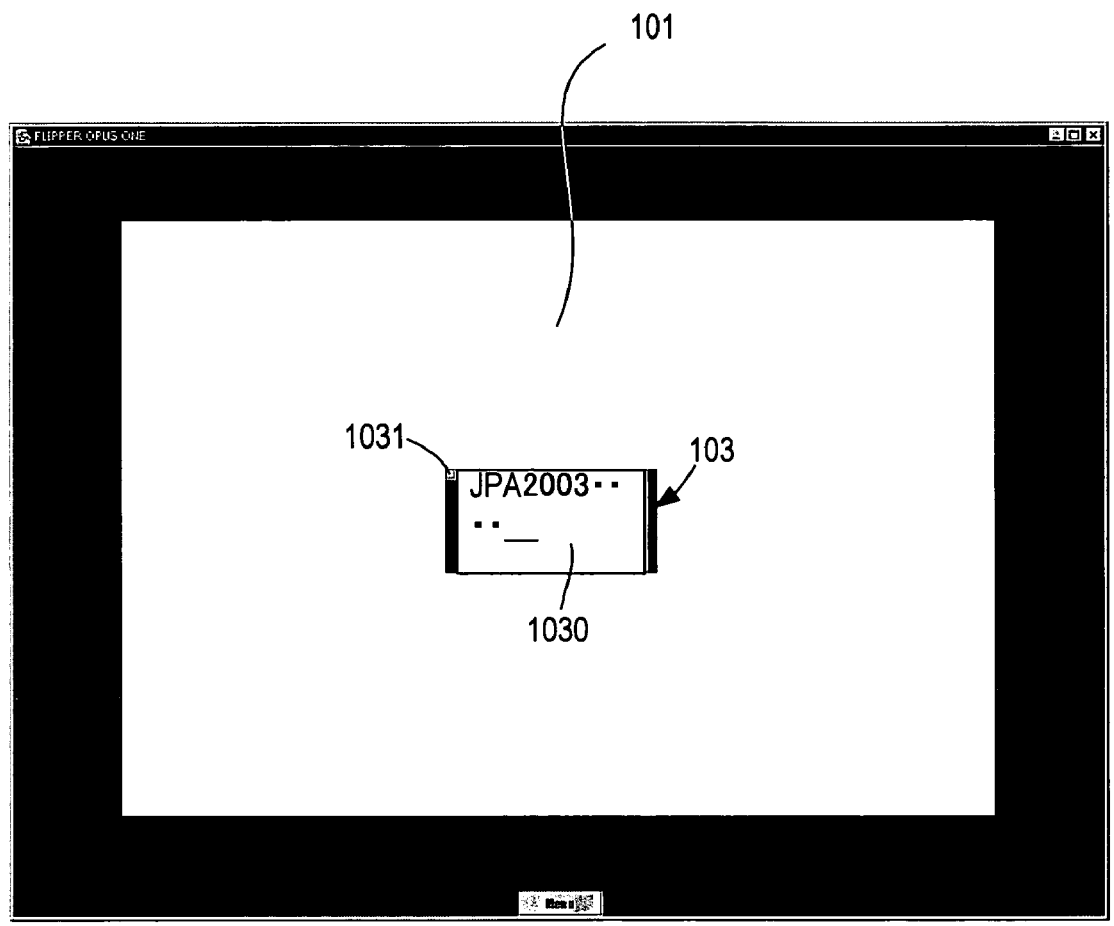
FIG. 33 is an explanatory diagram of the application window in a state where a search character string has been inputted into the card-type object.

FIG. 33 depicts a state where the search text was inputted into the empty card-type object 103. In this embodiment, search text which says, "See overview of limitless region, and migrate the object as if flicking it," is inputted. After inputting, the execute button 1031 is pressed to execute the concept search, and, as shown in FIG. 34, multiple card objects 103 are displayed in the operation region 101 and the overview region 102 as the search results.

Figure 34:
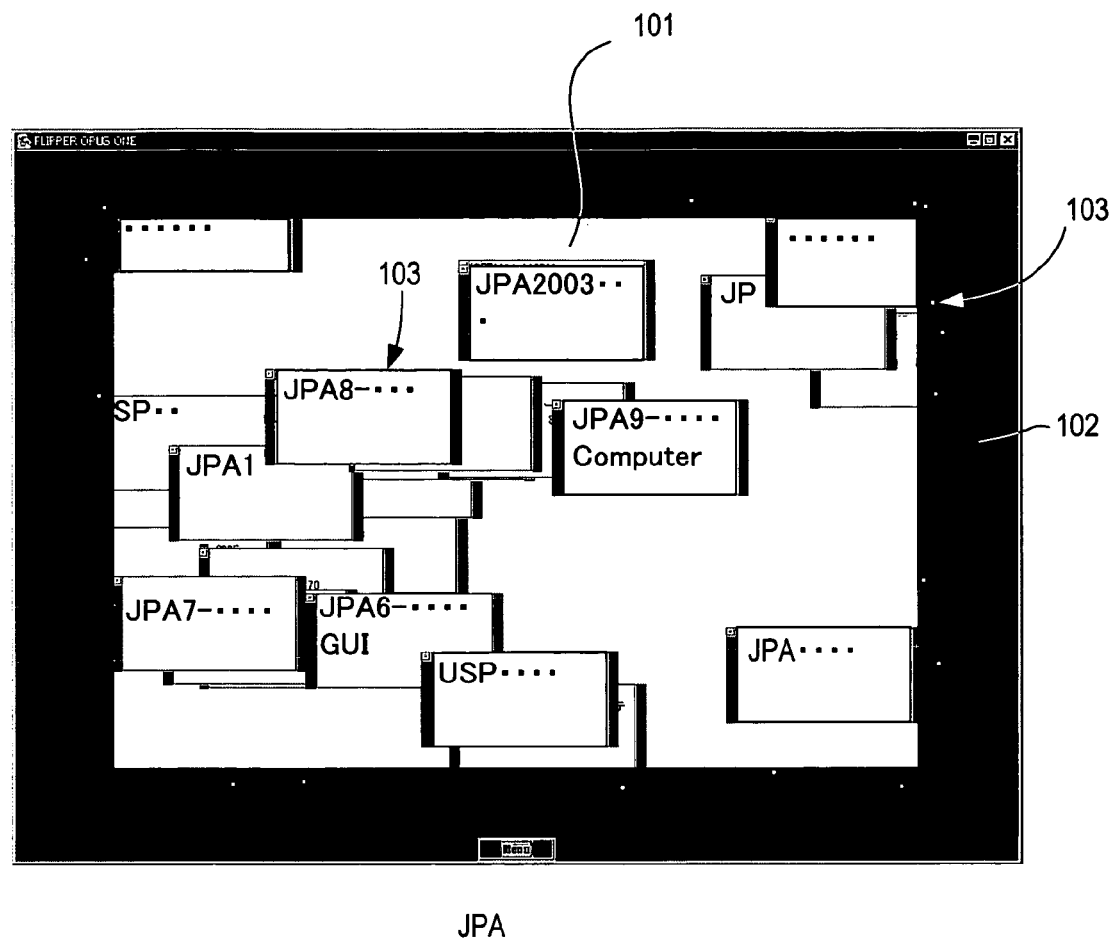
FIG. 34 is an explanatory diagram of the application window in a state where a search result is displayed.
Figure 35:
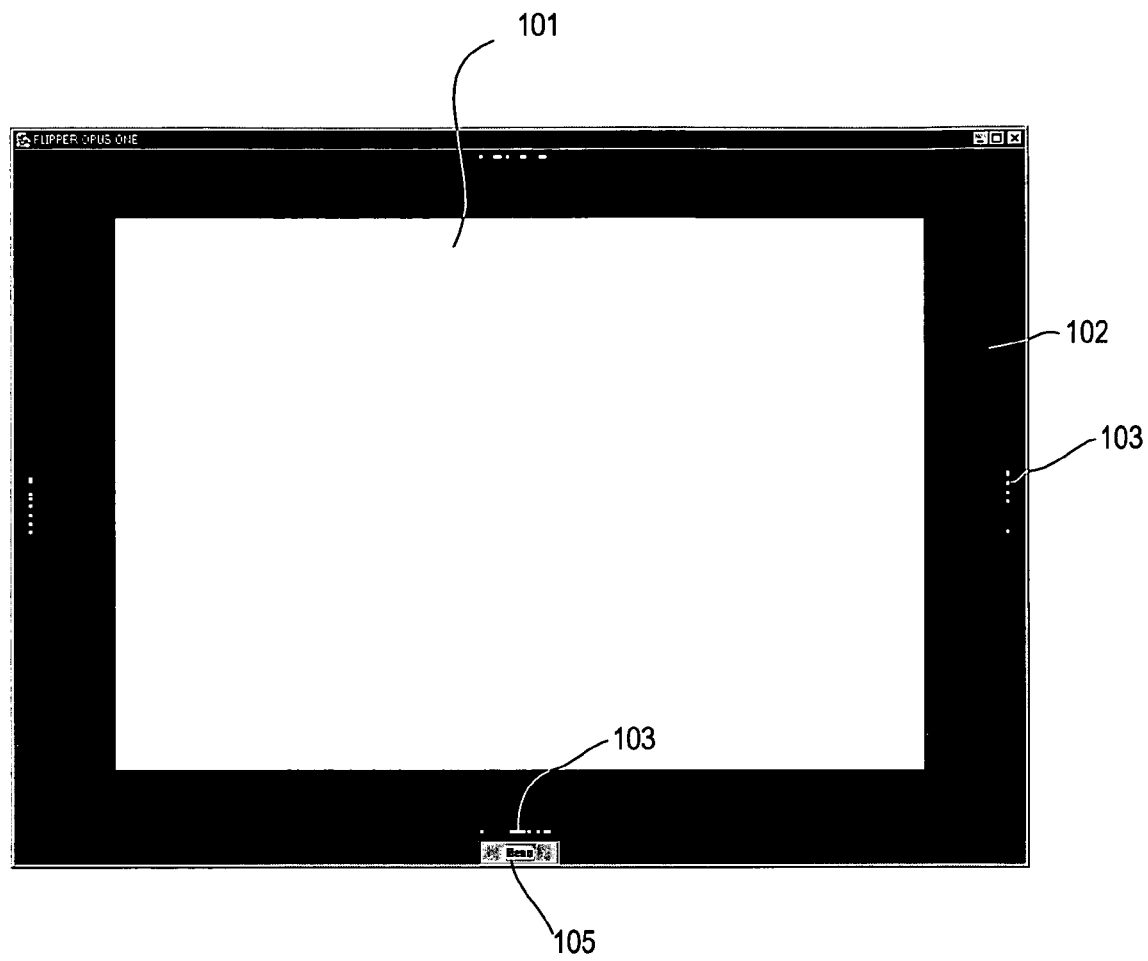
FIG. 35 is an explanatory diagram of the application window showing a state where categorization has finished.

In this embodiment, related patents are searched, and results are shown in terms of "publication number, title, category code, applicant." In FIG. 34, the user migrates the card object 103 by means of the above-mentioned drag operation and flip operation, and the search result is categorized in the overview region 102. The search results are categorized into four categories. FIG. 35 shows the final state, in which the objects are separated to the top, bottom, left, and right of the overview region 102.

As described above, when dividing many of the objects 103, the details can be confirmed in the operation region 101, and categories according to which the objects are sorted are made to be associated with the positions on the overview region 102. Thus, many objects 103 can be migrated, to be categorized.

At this time, by performing the above-mentioned flip operation, the object 103 can be migrated far with a small migration amount of the mouse 31. Thus, many objects can be operated easily and quickly.

Furthermore, by separating the operation region 101 and the overview region 102, detailed information on the object 103 can be confirmed in the operation region 101, and the object 103 can be migrated to the position on the overview region 102 corresponding to the sorting categories, whereby the desired object can be obtained quickly. For example, in order to confirm the detailed information on the objects 103, in a state where the objects 103 are sorted into the top, bottom, left, and right overview region 102 as in FIG. 35, the overview region 102 where the objects 103 are present should be clicked so that the operation region 101 is migrated to the position of the mouse cursor 32, whereby the content of the object 103 can be confirmed immediately, and the desired object 103 can be found quickly.

Furthermore, after the operation region 101 has been migrated, the menu button 105 can be pressed to perform the above-mentioned parameter modifications, whereby the above-mentioned zoom in/zoom out can be performed. By performing the zoom in/zoom out, the range on the virtual plane 50 displaying the detailed information can be modified, whereby the retrieval of the desired object 103 can be performed quickly.

Figure 36:
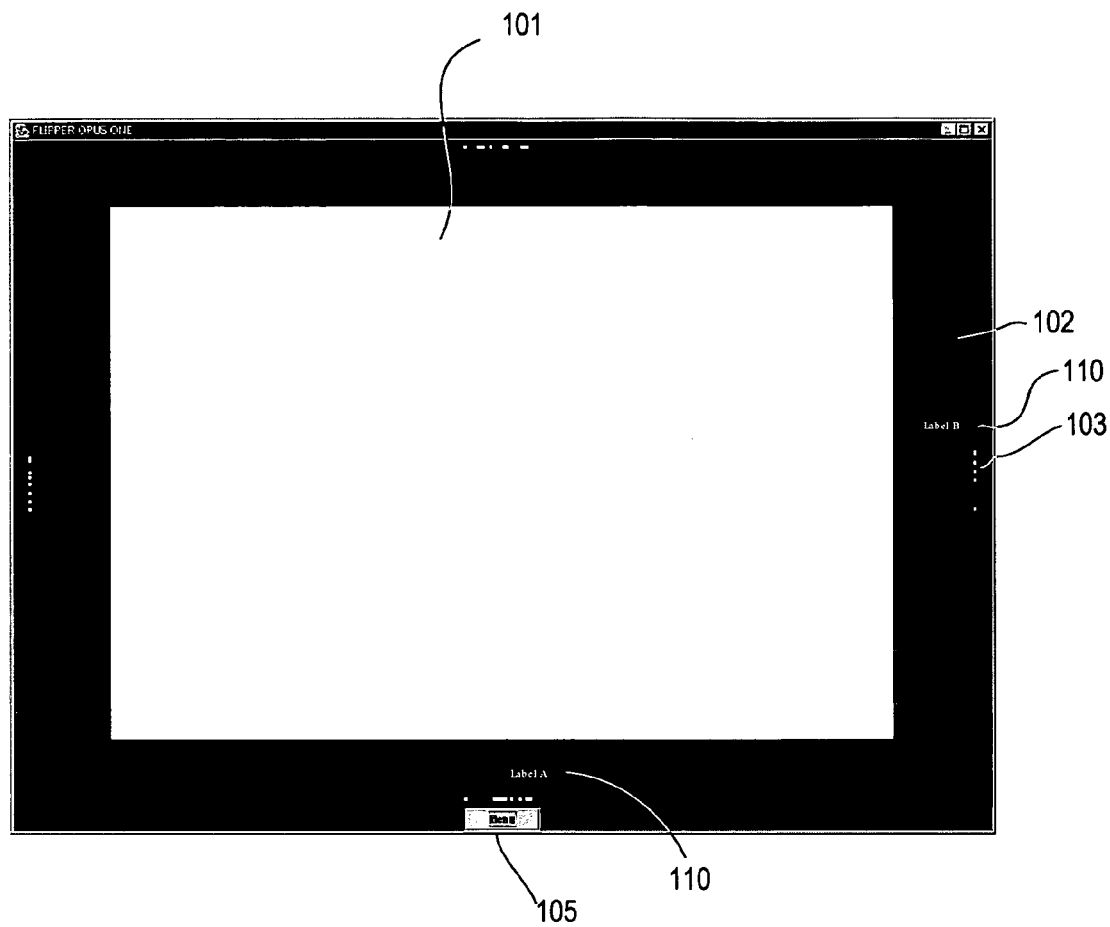
FIG. 36 is an explanatory diagram of the application window in a state where the categorization is finished, and a label is set.

Furthermore, in the state shown in FIG. 35, the menu button 105 is pressed and a label text string can be inputted to assign a label 110 to the entire card in the operation region 101. FIG. 36 shows a state where a label 110 is assigned to the result from the categorization of the card-type objects 103 shown in FIG. 35.

It should be noted that, in the above-mentioned embodiment, the card-type object was used as the object 103. Although not shown in the figure, the object 103 can also be constructed as an icon, text data, image data, HTML data, folder contents, an application-specific input/output form or the like, as described above.

As described above, in accordance with the object categorization GUI of this invention, the virtual projection body 60 is provided with the projection surface which encompasses the limitlessly broad field of vision, the projection surface of the virtual projection body 60 is deformed into the rectangular plane, and the object that is displayed on the overview region 102 is displayed as the speck or as the figure with the small surface area, whereby it is possible to provide an overview of many objects as a whole.

Furthermore, by providing the projection surface with the plane for performing projection (the detailed projection surface 62) which is used as the operation region 101, it becomes possible to perform object display, input/output, migration, iconization, and other such detailed operation of the object.

The user of the computer 1 can display a large number of objects in the limited display region, and by displaying the overview and the details of many objects, the desired object can easily be selected.

Furthermore, in a case where the drag operation to quickly migrate the mouse 31 is detected, and the speed of the drag operation exceeds the threshold value, the migration amount of the object is made greater than the actual migration amount of the mouse cursor 32, whereby it becomes possible to efficiently migrate the object from the operation region 101 to the overview region 102 and categorize it.

It should be noted that, the above-mentioned embodiment showed an example in which the mouse 31 is used as the pointing device, but it is possible to use a stylus pen, a tablet, a track pad, a track ball or the like as the pointing device.

Furthermore, in the case where the drag operation or the flip operation is performed with the stylus pen or the tablet, the operation is performed is a sequence in which the pointer (cursor 32) is paced on the object, then the pen tip is pressed on the screen or the tablet, and then while being pressed down the pointer is migrated, and then the pen tip is removed.

Furthermore, the above-mentioned embodiment showed an example in which the object categorization GUI is executed as an application, but it may also be executed as the GUI of the OS.

Furthermore, in the above-mentioned embodiment, the object in the overview region 102 was displayed as a speck, but the overview region 102 is not restricted to this, and it can be constructed with figures or characters showing the presence of the object.

Furthermore, in the above-mentioned embodiment, the operation region 101 was formed in the rectangular shape, and the overview region 102 was the surrounding frame, but they are not restricted to this, and they may be formed in any shape.

Furthermore, in the above-mentioned embodiment, the virtual projection body 60 was formed as a cuboid, but it is not restricted to this. For example, the virtual projection body 60 may be formed as a cubic. In this case, the coordinate conversion is performed between the detailed projection surface 62 and the operation region 101, which have mutually different shapes. Similarly, the coordinate conversion may be performed between the overview projection surface 61 and the overview region 102.

<Variation 1>

Figure 37:
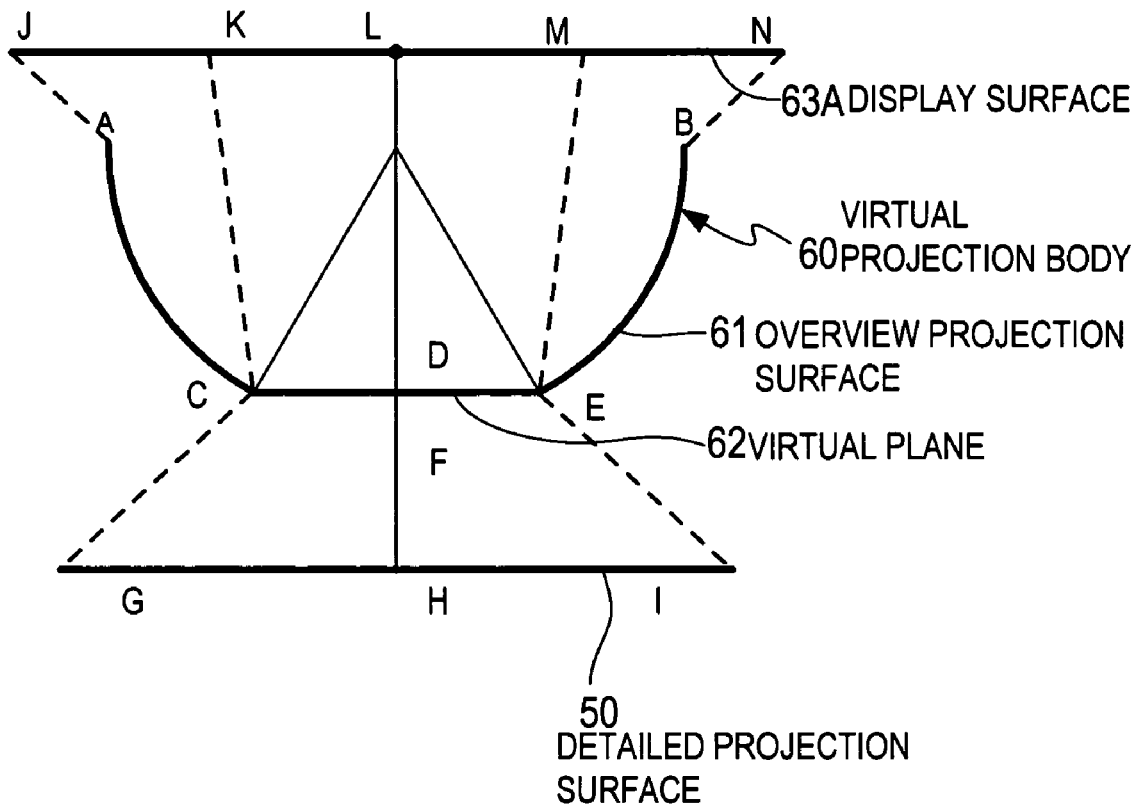
FIG. 37 is an explanatory diagram showing a first variation, showing a relationship between the virtual plane, the virtual projection body, and a display surface.

FIG. 37 shows a first variation, in which the display surface is provided behind the projection surface. Other constructions are similar to the above-mentioned embodiment.

In the above-mentioned embodiment, the overview projection surface 61 was opened into a plane and joined with the detailed projection surface 62 to thus form the projection surface 62, but in Variation 1 a plane is placed at a predetermined distance away from the virtual projection body 60 to thus form a display surface 63A, and the object 103 that is projected on to the overview projection surface 61 and the detailed projection surface 62 is projected onto the display surface 63A. Then, the display surface 63A corresponds to the display region 20A (or the application window 41) of the display device 20.

An arc AC, a line segment CE, and an arc EB on the projection surface are linearly extended, and are projected onto the display surface 63A as a line segment JK, a line segment KM, and a line segment MN. Due to this processing, the overview region 102 can be reshaped into a rectangular shape.

<Variation 2>

Figure 38:
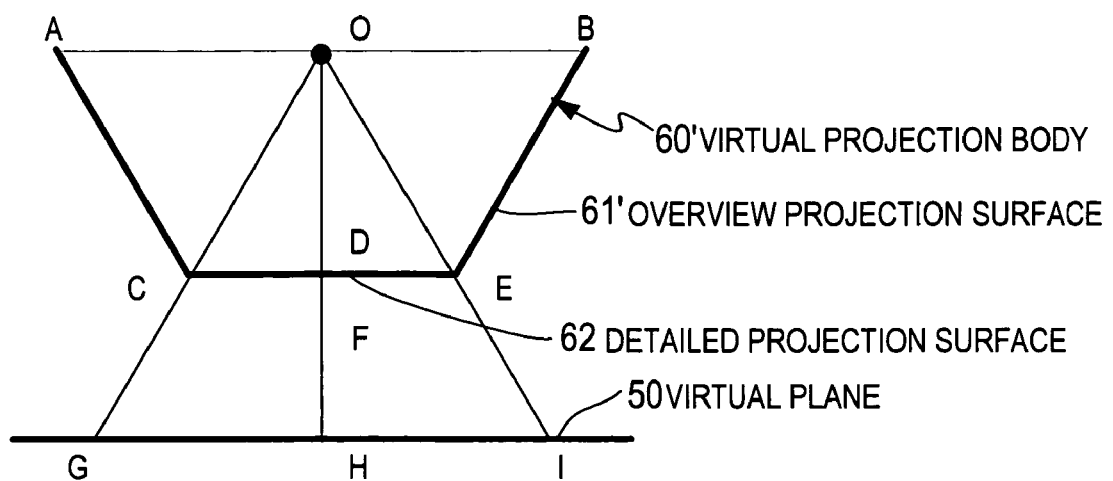
FIG. 38 is an explanatory diagram showing a second variation, showing the relationship between the virtual plane, the virtual projection body, and the display surface.

FIG. 38 shows a second variation. The virtual projection body 60 of the above-mentioned embodiment, which is shown in FIG. 3 and FIG. 4A, is formed with its quadrangular pyramid tip formed as a plane, as a cross-section with a trapezoid shape. Other constructions are similar to the above-mentioned embodiment.

The virtual projection body 60' is formed as a quadrangular pyramid shape. The overview projection surface 61 is formed as a plane that is slanted at a predetermined angle, and projects the object 103 on the virtual plane 50 between straight lines AC, EB in the figure. The detailed projection surface 62 which faces the virtual plane 50 is similar to the above-mentioned embodiment. In this variation, the overview projection surface 61 is formed in a plane. Therefore, the computations when opening from the projection surface to the display surface 63 can be performed easily, and the computation processing can be accelerated.

<Variation 3>

Figure 39:
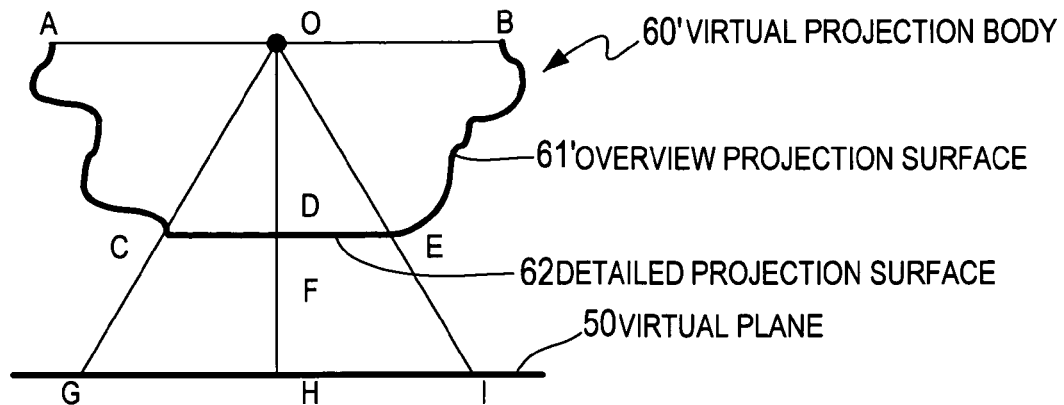
FIG. 39 is an explanatory diagram showing a third variation, showing the relationship between the virtual plane, the virtual projection body, and the display surface.

FIG. 39 shows a third variation. The virtual projection body 60 of the above-mentioned embodiment, which is shown in FIG. 3 and FIG. 4A, is formed with its sides formed as free curved lines. Other constructions are similar to the above-mentioned embodiment.

The virtual projection body 60' is formed with its cuboid sides formed as free curved surfaces, and line segments AC, EB are formed as free curved lines. The object 103 on the virtual plane 50 is projected between these free curved lines AC, EB, and is displayed on the overview region 102. The detailed projection surface 62 facing the virtual plane 50 is similar to the above-mentioned embodiment.

In this case, similarly to the above-mentioned embodiment, the free curved lines AC, EB are opened to straight lines, whereby the object 103 that is projected on the free curved surface of the virtual projection body 60 can be displayed on the overview region 102.

<Variation 4>

Figure 40:
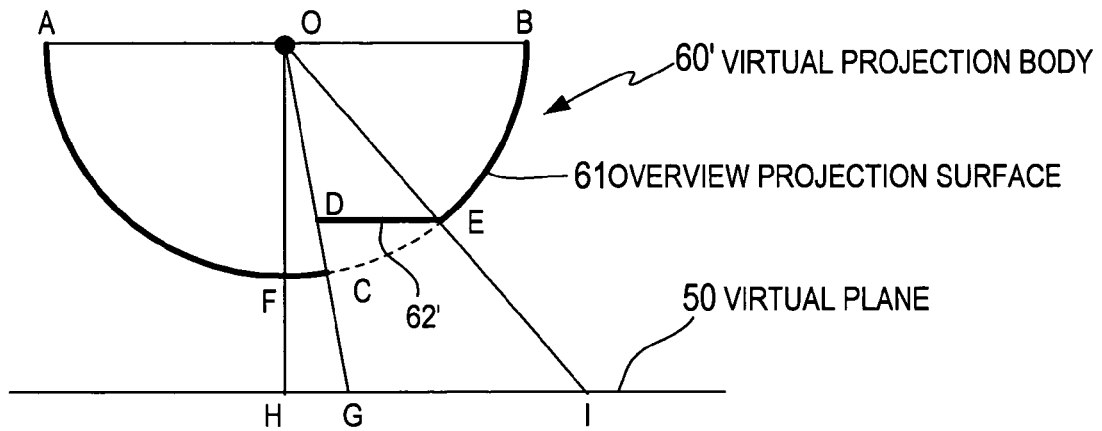
FIG. 40 is an explanatory diagram showing a fourth variation, showing the relationship between the virtual plane, the virtual projection body, and the display surface.

FIG. 40 shows a fourth variation. The detailed projection surface 62 that was shown in FIGS. 3 and 4A is offset from the center of perspective O. Other constructions are similar to the above-mentioned embodiment.

In the above-mentioned embodiment, the center of the detailed projection surface 62 was arranged above the center of perspective O, but the fourth variation shows an example in which the detailed projection surface 62' is arranged at a position where the line above the center of perspective O does not pass through. It should be noted that the overview projection surface 61 is constructed with a curved surface similarly to the above-mentioned embodiment.

In order to determine the size of the detailed projection surface 62' in correspondence to the operation region 101, a line segment GI corresponding to the operation region 101 on the virtual plane 50 is taken, and a point E is obtained where a line segment, which joins together a point I located only a predetermined distance from a center point H of the virtual plane 50 (a point above the center of perspective O) and the center of perspective O, intersects with a semicircle AFB that is a cross-section of the virtual projection body 60. Then, a point D is obtained, which is the intersection point of a line segment GO connecting a point G near the center H of the virtual plane 50 on the line segment GI and the center of perspective O, and a straight line drawn parallel to the virtual plane 50 from the point E. The plane passing through the straight line that joins the points DE which were thus derived, serves as the detailed projection surface 62'. In this case, the projection surface is constructed with an arc AFC, a line segment DE, and an arc EB.

In accordance with this invention, the center of the operation region 101 does not necessarily have to be located at a central portion of the detailed projection surface 62'.

<Variation 5>

Figure 41:
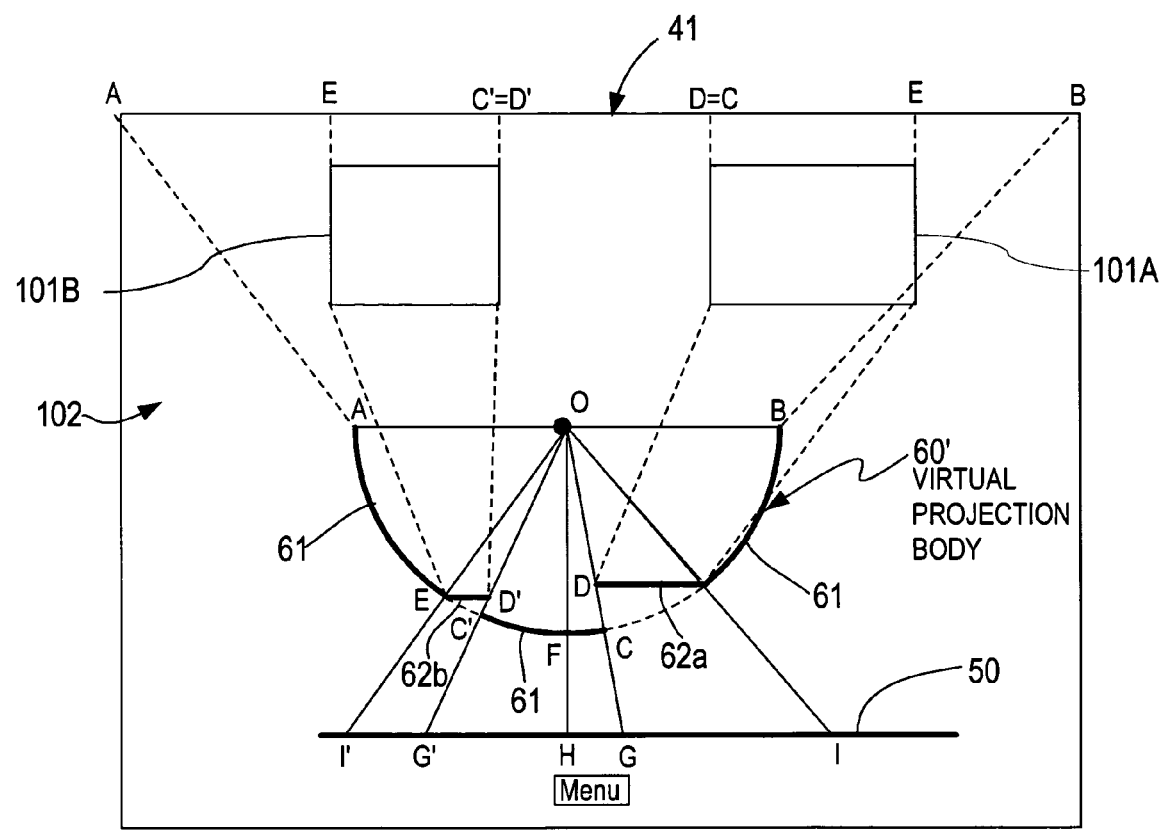
FIG. 41 is an explanatory diagram showing a fifth variation, showing the relationship between the virtual plane, the virtual projection body, and the display surface.

FIG. 41 shows a fifth variation. Another detailed projection surface is added to the fourth variation, and two operation regions 101A and 101B are displayed on the application window 41.

The detailed projection surface 62a is identical to the detailed projection surface 62' of the fourth variation. The object 103 projected on the detailed projection surface 62a is displayed on an operation region 101A in the application window 41.

Sandwiching the point H below the center of perspective O, a detailed projection surface 62b is provided to the virtual projection body 60' on the opposite side of the detailed projection surface 62a. The object 103 projected on the detailed projection surface 62b is displayed in an operation region 101B inside the application window 41.

Therefore, the region indicated by the line segment GI on the virtual plane 50 is projected on the line segment DE on the projection surface (display surface), to form the rectangular operation region 101A. The region indicated by the line segment G'I' on the virtual plane 50 is projected on the line segment D'E' on the projection surface, to form the operation region 101B. Objects that are not present in either of the operation regions are projected on the projection surface of the overview region 102.

<Variation 6>

Figure 42:
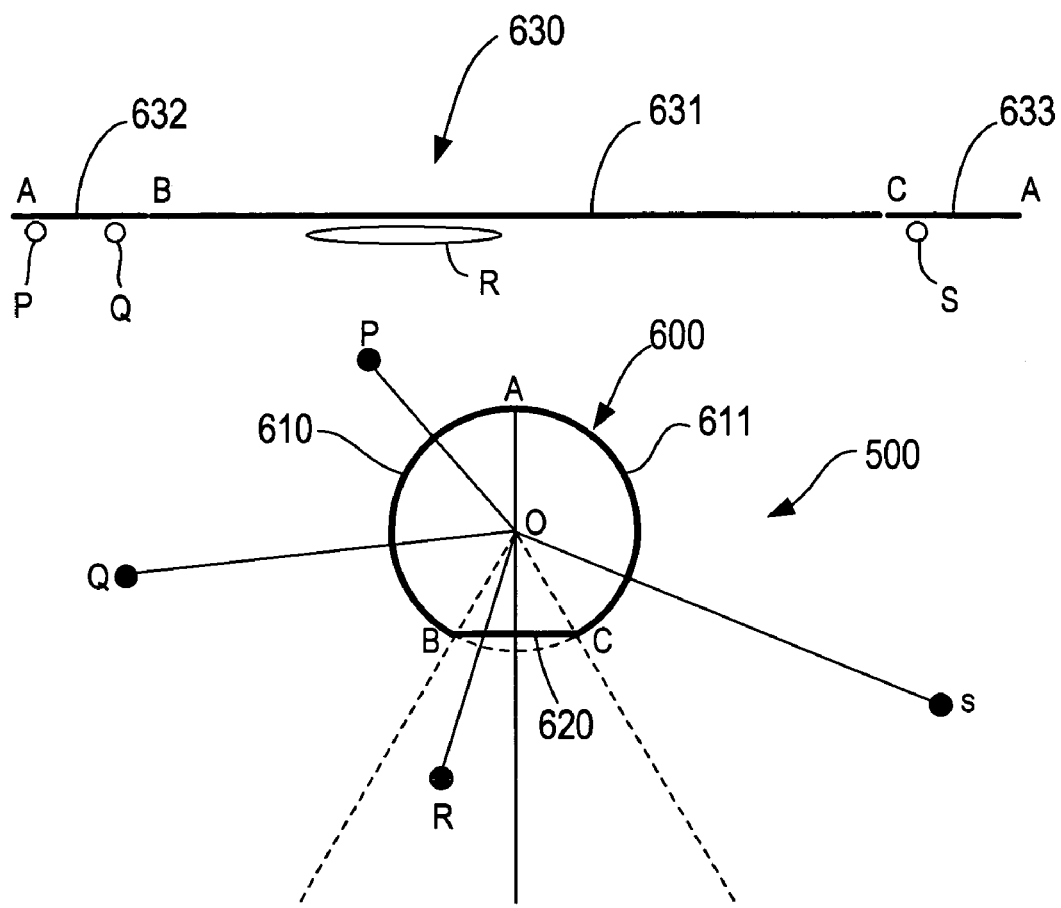
FIG. 42 is an explanatory diagram showing a sixth variation, showing the relationship between the virtual plane, the virtual projection body, and the display surface.

FIG. 42 shows a sixth variation, showing a summary of a projection system when the virtual plane 50 from the first embodiment is formed as a three-dimensional virtual space 500.

FIG. 42 shows a projection system 600 for performing an overview of the three-dimensional virtual space 500, and a display surface 600. In the case of performing the overview of the three-dimensional virtual space 500, the projection system 600 is arranged inside the virtual space 500. The projection system 600 is divided into a portion 620 (detailed projection surface) for performing plane projection indicated by line segment BC in the diagram, and portions 610, 611 (overview projection surface) for performing curved surface projection indicated by arc BAC. A point R within a region extending from straight lines OB and OC becomes the projection onto the plane 620, and is projected on the plane 631 which forms the center of the display surface 630. Then, the object that is projected on the plane 631 is displayed on the operation region 101.

On the other hand, points P, Q, S which are present outside the region extending from the straight lines OB and OC are projected onto the curved surfaces 610, 611. The object projected on the curved surface 610 is projected onto a plane 632 indicated by line segment AB on the display surface 630, and the object projected on the curved surface 611 is projected on a plane 633 indicated by line segment CA on the display surface 630. These planes 632, 633 are displayed on the overview region 102 in the application window 41.

The overview of the entirety of the virtual space 500 is achieved by the projection onto the curved surfaces 610, 611. When the projection system 600 is constructed by this method, the operation region 101 inside the application window 41 tends to become narrower. Therefore, when constructing the display surface 630 from the projection system 600, a portion 631 which corresponds to the plane projection on the display surface 630 may be given a large size with respect to the portions 632, 633 that correspond to the curved surface projection.

It should be noted that in the third object operation method, the processing of arranging the projection surface pre-set in the virtual space includes: processing of setting, on the projection surface, a first projection surface for projecting details of the object; and processing of setting a second projection surface for projecting the position where the object is present, and the processing of computing the position of the object on the projection surface includes: processing of computing the position of the object projected on the first projection surface; and processing of computing the position of the object projected on the second projection surface.

According to a fourth object operation method, in the third object operation method, the processing of displaying the object in the display region includes: processing of setting, in the display region of the display device, a first display region for displaying the object projected on the first surface, and a second display region for displaying the presence of the object projected on the second display surface, and the processing of converting the position in the display region of the display device includes: processing of converting the object projected on the first projection surface into a position in the first display region; and processing of converting the position of the object projected on the second projection surface into a position in the second display region.

According to a fifth object operation method, in the fourth object operation method, the processing of displaying the object in the display region includes: processing of displaying, in the second display region, information indicating the presence of the object; and processing of displaying the details of the object in the first display region arranged inside of the second display region.

According to a sixth object operation method, in the third object operation method, in the processing of setting the display surface with the first projection surface for projecting the details of the object, a plane is set facing the virtual space and this plane serves as a first projection surface.

According to a seventh object operation method, in the fourth object operation method, the processing of displaying the object in the display region includes: processing of displaying, in the second display region, information indicating the presence of the object; and processing of displaying the details of the object in the first display region arranged inside of the second display region.

According to an eighth object operation method, in the fourth object operation method, the processing of displaying the object in the display region includes: processing of setting, as a rectangular region, in the display region of the display device, the second display region for displaying the presence of the object projected on the second projection surface; and processing of setting the first display region, within the inner perimeter of the second display region, as a rectangular region displaying the object projected on the first projection surface.

According to a ninth object operation method, in the eighth object operation method, the processing of operating the object in the display region based on the instruction from the pointing device includes: processing of detecting a selection movement of the pointing device in the second display region; processing of converting the position in the display region where the selection movement is performed into a position in the virtual space, at a time when the selection movement by the pointing device is detected; and processing of migrating the first display region to the position in the virtual space produced by the conversion.

As described above, the object categorization GUI according to this invention can be used for a man-machine interface, for selecting and categorizing a large number of objects easily and quickly.

While the present invention has been described in detail and pictorially in the accompanying drawings, the present invention is not limited to such detail but covers various obvious modifications and equivalent arrangements, which fall within the purview of the appended claims.

What is claimed is:

1. A computer memory storing a GUI program for operating an object displayed in a display region of a display device by a pointing device, the program causing a computer to perform steps of:

arranging the object in a pre-set virtual space;

arranging a projection surface that is pre-set in the virtual space;

computing a position of the object on the projection surface, corresponding to a position of the object in the virtual space;

converting the position of the object on the projection surface, into a position in the display region of the display device;

displaying the object in the display region; and operating the object in the display region, based on an instruction from the pointing device, wherein the step of arranging the projection surface pre-set in the virtual space includes the steps of:

setting, on the projection surface, a first projection surface for projecting details of the object; and setting a second projection surface for projecting a position where the object is present, wherein the step of computing the position of the object on the projection surface includes the steps of:

computing the position of the object projected on the first projection surface; and computing the position of the object projected on the second projection surface, wherein a second display region represents a display region for a symbol indicating the presence of the object, and wherein the step of operating the object in the display region based on the instruction from the pointing device includes steps of:

detecting a drag operation by the pointing device;

detecting a migration speed of the pointing device when the drag operation by the pointing device is detected; and setting a migration amount greater than the migration amount indicated by the pointing device and migrating the object when the migration speed exceeded a pre-set threshold value, wherein the migration amount increases according to an increase in the migration speed when the migration speed exceeded the threshold value.

2. The computer memory according to claim 1, wherein the step of displaying the object in the display region includes: step of setting, in the display region of the display device, a first display region for displaying the object projected on the first projection surface, and a second display region for displaying the presence of the object projected on the second projection surface, and the step of converting the position in the display region of the display device includes: step of converting the object projected on the first projection surface into a position in the first display region; and step of converting the position of the object projected on the second projection surface into a position in the second display region.

3. The computer memory according to claim 2, wherein the step of displaying the object in the display region includes steps of:

displaying, in the first display region, details of the object; and displaying the information indicating the presence of the object in the second display region.

4. The computer memory according to claim 2, wherein the step of displaying the object in the display region includes steps of:

displaying, in the second display region, information indicating the presence of the object; and displaying the details of the object in the first display region arranged inside of the second display region.

5. The computer memory according to claim 2, wherein the step of displaying the object in the display region includes steps of:

setting, as a rectangular region, in the display region of the display device, the second display region for displaying the presence of the object projected on the second projection surface; and setting the first display region, within the inner perimeter of the second display region, as a rectangular region displaying the object projected on the first projection surface.

6. The computer memory according to claim 5, wherein the step of operating the object in the display region based on the instruction from the pointing device includes steps of:

detecting a selection movement of the pointing device in the second display region;

converting the position in the display region where the selection movement is performed into a position in the virtual space, when the selection movement by the pointing device is detected; and migrating the first display region to the position in the virtual space produced by the conversion.

7. The computer memory according to claim 1, wherein in the step of setting the display surface with the first projection surface for projecting the details of the object, a plane is set facing the virtual space and the plane serves as the first projection surface.

8. A data processing device, comprising:

a display device for displaying an object in a display region;

a pointing device for instructing operation of the object; and a control unit for executing the operation of the object in the display region, based on the instruction from the pointing device, wherein the control unit comprises:

an object management unit for arranging the object in a pre-set virtual space;

a coordinate conversion unit for arranging a projection surface that is pre-set in the virtual space, computing a position of the object on the projection surface corresponding to a position of the object in the virtual space, and converting the position of the object on the projection surface into a position in the display region of the display device;

a display unit for displaying the object in the display region; and an operation unit for operating the object in the display region, based on the instruction from the pointing device, wherein the coordinate conversion unit has a projection surface setting unit for setting a first projection surface for projecting details of the object, and a second projection surface for projecting a position where the object is present, wherein the position of the object projected on the first projection surface, and the position of the object projected on the second projection surface, are computed respectively, wherein a second display region represents a display region for a symbol indicating the presence of the object, and wherein the operation unit includes:

a drag operation detecting portion for detecting a drag operation by the pointing device;

a migration speed detecting portion for detecting a migration speed of the pointing device when the drag operation by the pointing device is detected; and a flip operation portion for instructing the coordinate conversion unit to set a migration amount greater than the migration amount indicated by the pointing device and migrate the object when the migration speed exceeded a pre-set threshold value.

9. The data processing device according to claim 8 wherein the display unit has a display region setting unit for setting, in the display region of the display device, a first display region for displaying the object projected on the first projection surface, and a second display region for displaying the presence of the object projected on the second projection surface, and the coordinate conversion unit converts the position of the object on the first projection surface into a position in the first display region, and converts the position of the object projected on the second projection surface into a position in the second display region.

10. The data processing device according to claim 9, wherein the display unit includes:

an operation region display unit for displaying, in the first display region, details of the object; and an overview region display unit for displaying the information indicating the presence of the object in the second display region.

11. The data processing device according to claim 10, wherein the operation region display unit arranges the first display region inside the second display region.

12. The data processing device according to claim 10, wherein the overview region display unit sets, as a rectangular region, in the display region of the display device, the second display region for displaying the presence of the object projected on the second projection surface; and the operation region display unit sets the first display region, within the inner perimeter of the second display region, as a rectangular region displaying the object projected on the first projection surface.

13. The data processing device according to claim 12, wherein the operation unit detects a selection movement of the pointing device in the second display region; converts the position in the display region where the selection movement is performed into a position in the virtual space, at a time when the selection movement by the pointing device is detected; and migrates the first display region to the position in the virtual space that was produced by the conversion.

14. The data processing device according to claim 8 wherein the project surface setting unit sets, a plane facing the virtual space and the plane serves as the first projection surface.

15. An object operation method for operating an object displayed in a display region of a display device connected to a computer by a pointing device, comprising causing a computer to execute steps of:

arranging the object in a pre-set virtual space;

arranging a projection surface that is pre-set in the virtual space;

computing the position of the object on the projection surface, corresponding to the position of the object in the virtual space;

converting the position on the projection surface into a position in the display region of the display device;

displaying the object in the display area; and operating the object in the display region, based on an instruction from the pointing device, wherein the step of arranging the projection surface pre-set in the virtual space includes the steps of:

setting, on the projection surface, a first projection surface for projecting details of the object; and setting a second projection surface for projecting a position where the object is present, wherein the step of computing the position of the object on the projection surface includes the steps of:

computing the position of the object projected on the first projection surface; and computing the position of the object projected on the second projection surface, wherein a second display region represents a display region for a symbol indicating the presence of the object, and wherein the step of operating the object in the display region based on the instruction from the pointing device includes steps of:

detecting a drag operation by the pointing device;

detecting a migration speed of the pointing device when the drag operation by the pointing device is detected; and setting a migration amount greater than the migration amount indicated by the pointing device and migrating the object when the migration speed exceeded a pre-set threshold value.

* * * * *